(12) United States Patent
Yonemura et al.

(10) Patent No.: US 10,030,134 B2
(45) Date of Patent: Jul. 24, 2018

(54) ACRYLIC THERMOPLASTIC RESIN COMPOSITION AND MOLDED ARTICLE THEREOF

(75) Inventors: Masami Yonemura, Tokyo (JP); Mayuko Kimura, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/129,230

(22) PCT Filed: Jun. 28, 2012

(86) PCT No.: PCT/JP2012/066550
§ 371 (c)(1),
(2), (4) Date: Dec. 24, 2013

(87) PCT Pub. No.: WO2013/005634
PCT Pub. Date: Jan. 10, 2013

(65) Prior Publication Data
US 2014/0128547 A1    May 8, 2014

(30) Foreign Application Priority Data

Jul. 1, 2011 (JP) .................................. 2011-147330

(51) Int. Cl.
*C08L 33/00* (2006.01)
*C08L 33/12* (2006.01)
*C08F 222/40* (2006.01)
*G02B 1/04* (2006.01)
*C08L 33/08* (2006.01)
*C08J 5/18* (2006.01)
*C08L 35/00* (2006.01)
*C08F 220/14* (2006.01)

(52) U.S. Cl.
CPC ............ *C08L 33/12* (2013.01); *C08F 220/14* (2013.01); *C08F 222/40* (2013.01); *C08J 5/18* (2013.01); *C08L 33/08* (2013.01); *C08L 35/00* (2013.01); *G02B 1/04* (2013.01); *G02B 1/041* (2013.01); *C08J 2333/12* (2013.01); *C08L 2201/08* (2013.01); *C08L 2201/10* (2013.01); *C08L 2203/16* (2013.01); *C08L 2205/025* (2013.01)

(58) Field of Classification Search
CPC ....................................................... C08L 33/12
See application file for complete search history.

(56) References Cited

U.S. PATENT DOCUMENTS 4,753,996 A * 6/1988 Sato .............................. 525/205
4,810,055 A * 3/1989 Suganuma et al. ........... 385/143

(Continued)

FOREIGN PATENT DOCUMENTS

JP    55-102614 A    8/1980
JP    57-153008 A    9/1982

(Continued)

OTHER PUBLICATIONS

Office Action issued in counterpart Taiwanese Patent Application No. 101123401 dated Apr. 7, 2014.
Yoshimi et al., "Phase-difference film," Chemistry Review No. 39 (1998).
Tagaya et al., "Zero Birefringences Optical Polymers," Macromolecules, 39: 3019-3023 (2006).
Tagaya et al., "Design of Zero Zero-birefringence Polymers for Injection Molded Products with Low Birefringence," Seikei-Kakou, 21: 426-435 (2009).

(Continued)

*Primary Examiner* — Irina Krylova
(74) *Attorney, Agent, or Firm* — Morgan, Lewis & Bockius LLP

(57) ABSTRACT

An acrylic thermoplastic resin composition includes a first acrylic resin having a first structural unit represented by the following formula (1) and a second structural unit represented by the following formula (2), and a second acrylic resin having the first structural unit represented by the following formula (1) and a third structural unit represented by the following formula (3), in which a total content of the first unit is 50 to 95 mass % and a total content of the second structural unit and the third structural unit is 5 to 50 mass % based on a total amount of the first acrylic resin and the second acrylic resin:

[Chemical Formula 1]

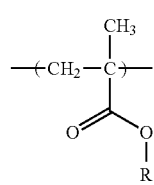

(1)

[Chemical Formula 2]

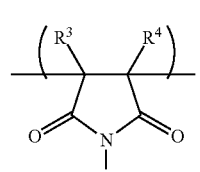

(2)

[Chemical Formula 3]

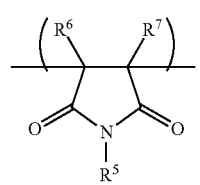

(3)

21 Claims, 2 Drawing Sheets

(56) References Cited

U.S. PATENT DOCUMENTS

| | | | | |
|---|---|---|---|---|
| 5,155,190 A | * | 10/1992 | Okinaka | C08F 220/14 |
| | | | | 526/203 |
| 5,319,043 A | * | 6/1994 | Shen | 526/262 |
| 2009/0192267 A1 | * | 7/2009 | Kim et al. | 525/186 |
| 2011/0269910 A1 | * | 11/2011 | Chun et al. | 525/205 |
| 2012/0004372 A1 | * | 1/2012 | Kang | C08L 33/10 |
| | | | | 525/185 |

FOREIGN PATENT DOCUMENTS

| | | | |
|---|---|---|---|
| JP | 61095011 | * | 5/1986 |
| JP | 61-171708 A | | 8/1986 |
| JP | 61-252211 A | | 11/1986 |
| JP | 62-270648 A | | 11/1987 |
| JP | 63-001964 B2 | | 1/1988 |
| JP | 64-079248 A | | 3/1989 |
| JP | 05-086252 A | | 4/1993 |
| JP | 06-242301 A | | 9/1994 |
| JP | 09-255838 A | | 9/1997 |
| JP | 4424636 B2 | | 3/2010 |
| WO | WO2010079920 | * | 7/2010 |

OTHER PUBLICATIONS

Miyatake, "Assignment and improvement conditions of optical film for large screen LCD displays," Monthly Display April Issue (2005).
International Search Report issued in corresponding International Patent Application No. PCT/JP2012/066550 dated Sep. 18, 2012.
International Preliminary Report on Patentability issued in corresponding International Patent Application No. PCT/JP2012/066550 dated Jan. 16, 2014.

* cited by examiner

ACRYLIC THERMOPLASTIC RESIN COMPOSITION AND MOLDED ARTICLE THEREOF

TECHNICAL FIELD

The present invention relates to an acrylic thermoplastic resin composition which excels in transparency, heat resistance, and weather resistance, and moreover, whose birefringence is highly controlled, and a shaped article thereof.

BACKGROUND ART

Conventional examples of transparent optical materials include methacrylic resins typified by a homopolymer of methyl methacrylate (PMMA), a polystyrene (PS), a styrene/methyl methacrylate copolymer (MS) and a polycarbonate (PC). In particular, methacrylic resins have been applied to industrial fields of signboards, lighting covers, automotive products, decorative articles and the like because they excel in transparency, surface hardness, weather resistance and the like, and have good shaping workability. Moreover, because of a small birefringence as an optical characteristic, methacrylic resins have also been applied as optical resins for optical materials such as optical disks, optical films and plastic substrates.

However, in recent years, with the development of various optical products, for example, flat panel displays such as liquid crystal displays, plasma displays and organic EL displays, small infrared sensors, micro-optical waveguides, microlenses, and pickup lenses for DVD/BlueRayDiscs handling short-wavelength light, not only excellent transparency but also high heat resistance and weather resistance, and control of a birefringence such as a low birefringence or a significant retardation have been required for optical resins for optical materials.

For example, in Patent Literature 1, as a novel transparent styrene copolymer whose heat resistance is improved, a styrene copolymer made of predetermined amounts of styrene, maleic anhydride, and methyl methacrylate is described. Moreover, in Patent Literatures 2 and 3, as a copolymer having excellent heat distortion resistance and water resistance, a copolymer obtained by polymerizing a structural mixture containing methyl methacrylate, maleic anhydride and styrene at a predetermined ratio is described.

Moreover, in Patent Literature 4, as a method of manufacturing a heat resistant acrylic resin having good optical purity, a manufacturing method in which a copolymer made of predetermined amounts of a methyl methacrylate unit and an N-alkyl-substituted maleimide unit is washed by a predetermined method is described. Furthermore, in Patent Literature 5, as a heat resistant resin, a copolymer of a structural mixture containing predetermined amounts of methyl methacrylate, N-arylmaleimide and an aromatic vinyl compound is described.

However, the copolymers and the like described in Patent Literatures 1 to 5 have a problem in weather resistance or low birefringence.

Furthermore, in recent years, as a result of refinement of the above-described various optical products, in addition to the above-described characteristics, higher uniformity of optical characteristics has been required as optical materials. In particular, it becomes necessary to control a birefringence (positive/negative/zero) of an optical material or prevent birefringence distribution in an optical material.

For example, with increase in size of flat panel displays, display screens are more often viewed not only from the front side but also from oblique directions. In such a case, due to the principle of display devices, there is a problem of display color change or contrast reduction depending on the angle at which they are viewed. Optical film materials are needed in order to improve the viewing angle characteristics, and a technique of controlling a birefringence of optical films to almost zero or to significant positive or significant negative have been required.

As a result of increase in size of flat panel displays, required optical materials are also increased in size, and since birefringence distribution is generated in the optical materials due to biased external force, there is a problem of contrast reduction. In order to reduce the birefringence distribution, an optical material having a small birefringence change caused by external force, that is, a small absolute value of a photoelastic coefficient has been required (Non Patent Literatures 1 and 2).

As a technique of controlling a birefringence of PMMA, for example, Non Patent Literatures 3 and 4 disclose a methyl methacrylate/2,2,2-trifluoroethyl methacrylate/benzyl methacrylate ternary copolymer (=52/42/6 mass %). Although the copolymer can control a birefringence and a photoelastic coefficient at the same time and can make the absolute values of birefringence and a photoelastic coefficient be zero at the same time (zero-zero birefringence), there was a problem of insufficient heat resistance.

Moreover, in Patent Literature 6, a thermoplastic resin composition containing a maleimide copolymer obtained by copolymerizing predetermined amounts of a methacrylate ester structure, a maleimide structure and an aromatic vinyl structure, and a copolymer obtained by copolymerizing predetermined amounts of a methacrylate ester structure and an aromatic vinyl structure is described. Moreover, in Patent Literature 7, as a transparent heat resistant resin composition, a transparent heat resistant resin composition containing a copolymer obtained by polymerizing predetermined amounts of methacrylate esters and a copolymer obtained by copolymerizing predetermined amounts of N-substituted maleimides (substituents are aromatic derivatives), respectively, at a predetermined ratio, is described. Moreover, in Patent Literature 8, as a transparent heat resistant methacrylic resin composition, a methacrylic resin composition containing a copolymer of a structural mixture made of predetermined amounts of methyl methacrylate, N-cyclohexyl maleimide and an aromatic vinyl compound, and a polymer containing a predetermined amount of methyl methacrylate, respectively, at a predetermined ratio, is described. Moreover, in Patent Literature 9, as a thermoplastic resin composition which excels in heat resistance, water resistance and shock resistance, a thermoplastic resin composition made of a copolymer obtained by polymerizing predetermined amounts of a specific maleimide compound, methyl methacrylate and a specific methacrylate ester, and a MMA polymer containing a predetermined amount of methyl methacrylate is described.

In contrast, in Patent Literature 10, a copolymer made of 70 to 85 wt % of methyl methacrylate monomer unit and 15 to 30 wt % of an N-substituted maleimide compound monomer unit and having an intrinsic birefringence of −0.002 to +0.002 at room temperature is disclosed.

CITATION LIST

Patent Literature

Patent Literature 1: JP 55-102614 A
Patent Literature 2: JP 57-153008 A

Patent Literature 3: JP 63-1964 B
Patent Literature 4: JP 61-252211 A
Patent Literature 5: JP 61-171708 A
Patent Literature 6: JP 9-255838 A
Patent Literature 7: JP 64-79248 A
Patent Literature 8: JP 62-270648 A
Patent Literature 9: JP 5-086252 A
Patent Literature 10: JP 6-242301 A Non Patent Literature Non Patent Literature 1: Chemical Review, 1988, No. 39 (Japan Scientific Societies Press)
Non Patent Literature 2: Monthly DISPLAY, 2005, April issue
Non Patent Literature 3: Seikei-Kakou, 2009, Vol. 21, No. 7, p. 426
Non Patent Literature 4: Macromolecules, 2006, 39, 3019-3023

SUMMARY OF INVENTION

Technical Problem

However, in Examples of Patent Literature 6, only an example using N-cyclohexyl maleimide as the maleimide structure is disclosed, and further there is a limitation in that N-cyclohexyl maleimide is preferable for imparting desired heat resistance and optical characteristics. In addition, regarding the thermoplastic resin composition described in Patent Literature 6, optical characteristics other than total light transmittance, turbidity (haze) and degree of yellowness (YI) are not focused, and a birefringence is not evaluated. Furthermore, there is a problem in that the heat resistance is not necessarily sufficient as currently required heat resistance.

Moreover, in Patent Literature 7, as the maleimide structure, only an example using maleimide having an aromatic derivative as a substituent is described, and furthermore, while optical characteristics (transparency, low birefringence, and the like) are disclosed, only a birefringence of a disk substrate as an injection-shaped article is evaluated, and birefringence distribution or the like in the shaped article is not suggested at all.

Moreover, in Patent Literature 8, there is disclosure about transparency (total light transmittance, turbidity (haze), and degree of yellowness (YI)), but there is not disclosure suggesting birefringence. Furthermore, in Patent Literature 9, there is not disclosure suggesting transparency (total light transmittance, turbidity (haze), and a degree of yellowness (YI)) or a birefringence.

Moreover, in Patent Literature 10, although an intrinsic birefringence is described, a photoelastic coefficient is not suggested and its optical characteristics are not necessarily sufficient.

Accordingly, in the range of conventional techniques, there is no technique that can provide an acrylic thermoplastic resin composition which excels in transparency, heat resistance and weather resistance, and moreover, whose optical characteristics (birefringence and photoelastic coefficient) are highly controlled, and a shaped article formed of it.

Therefore, it is an object of the present invention to provide an acrylic thermoplastic resin composition which excels in transparency, heat resistance and weather resistance, and moreover, whose optical characteristics (birefringence and photoelastic coefficient) are highly controlled, and a shaped article formed of the acrylic thermoplastic resin composition.

Solution to Problem

The present invention is made by finding the astonishing fact that a specific acrylic thermoplastic resin composition excels in transparency, heat resistance, and weather resistance, and moreover, its birefringence can be highly controlled.

That is, the present invention relates to the following.

[1] An acrylic thermoplastic resin composition includes a first acrylic resin having a first structural unit represented by the following formula (1) and a second structural unit represented by the following formula (2), and a second acrylic resin having the first structural unit represented by the following formula (1) and a third structural unit represented by the following formula (3), in which a total content of the first unit is 50 to 95 mass % and a total content of the second structural unit and the third structural unit is 5 to 50 mass % based on a total amount of the first acrylic resin and the second acrylic resin,

[Chemical Formula 1]

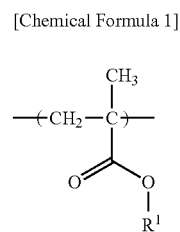

(1)

wherein, $R^1$ represents a hydrogen atom, an alkyl group having 1 to 12 carbon atoms, a cycloalkyl group having 5 to 12 carbon atoms, an arylalkyl group having 7 to 14 carbon atoms, an aryl group having 6 to 14 carbon atoms, or an aryl group having 6 to 14 carbon atoms with at least one substituent selected from the following Group A:

Group A: a halogen atom, a hydroxyl group, a nitro group, an alkoxy group having 1 to 12 carbon atoms, and an alkyl group having 1 to 12 carbon atoms;

[Chemical Formula 2]

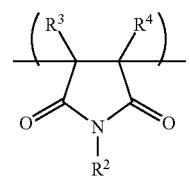

(2)

wherein $R^2$ represents an arylalkyl group having 7 to 14 carbon atoms, an aryl group having 6 to 14 carbon atoms, or an aryl group having 6 to 14 carbon atoms with at least one substituent selected from the following Group B, and $R^3$ and $R^4$ each independently represent a hydrogen atom, an alkyl group having 1 to 12 carbon atoms, or an aryl group having 6 to 14 carbon atoms:

Group B: a halogen atom, a hydroxyl group, a nitro group, an alkoxy group having 1 to 12 carbon atoms, an alkyl group having 1 to 12 carbon atoms, and an arylalkyl group having 7 to 14 carbon atoms;

[Chemical Formula 3]

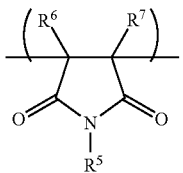

(3)

wherein, $R^5$ represents a hydrogen atom, a cycloalkyl group having 3 to 12 carbon atoms, an alkyl group having 1 to 12 carbon atoms, or an alkyl group having 1 to 12 carbon atoms with at least one substituent selected from the following Group C, and $R^6$ and $R^7$ each independently represent a hydrogen atom, an alkyl group having 1 to 12 carbon atoms, or an aryl group having 6 to 14 carbon atoms.

Group C: a halogen atom, a hydroxyl group, a nitro group, and an alkoxy group having 1 to 12 carbon atoms.

[2] The acrylic thermoplastic resin composition according to [1], in which, a content of the second structural unit is 0.1 to 49.9 mass % and a content of the third structural unit is 0.1 to 49.9 mass % based on a total amount of the first acrylic resin and the second acrylic resin.

[3] The acrylic thermoplastic resin composition according to [1] or [2], in which the first acrylic resin has, based on a total amount thereof, 50 to 95 mass % of the first structural unit and 5 to 50 mass % of the second structural unit.

[4] The acrylic thermoplastic resin composition according to any one of [1] to [3], in which the second acrylic resin has, based on a total amount thereof, 50 to 95 mass % of the first structural unit and 5 to 50 mass % of the third structural unit.

[5] The acrylic thermoplastic resin composition according to any one of [1] to [4], in which the $R^1$ is a methyl group or a benzyl group, the $R^2$ is a phenyl group or a phenyl group with at least one substituent selected from the Group B, and the $R^5$ is a cyclohexyl group.

[6] The acrylic thermoplastic resin composition according to any one of [1] to [5], in which the first acrylic resin has a weight average molecular weight Mw of 3000 to 1000000 and a ratio Mw/Mn of the weight average molecular weight Mw to a number average molecular weight Mn of 1 to 10 in terms of polymethyl methacrylate, which are measured by a GPC measuring method.

[7] The acrylic thermoplastic resin composition according to any one of [1] to [6], in which the second acrylic resin has a weight average molecular weight Mw of 3000 to 1000000 and a ratio Mw/Mn of the weight average molecular weight Mw to a number average molecular weight Mn of 1 to 10 in terms of polymethyl methacrylate, which are measured by a GPC measuring method.

[8] The acrylic thermoplastic resin composition according to any one of [1] to [7], in which an absolute value of a photoelastic coefficient is $3.0 \times 10^{-12}$ $Pa^{-1}$ or less.

[9] The acrylic thermoplastic resin composition according to any one of [1] to [8], in which, when shaped into a uniaxially-stretched film, a slope K in the following linear relational equation (a) by least squares approximation satisfies the following equation (b):

$$\Delta n = K \times S + C \quad (a)$$

$$|K| \leq 0.30 \times 10^{-5} \quad (b)$$

wherein a birefringence of the uniaxially-stretched film is defined as $\Delta n$ and a stretch ratio is defined as S, and C is a constant number and represents a birefringence when not being stretched.

[10] The acrylic thermoplastic resin composition according to any one of [1] to [9], in which an absolute value of retardation Re in an in-plane direction is 30 nm or less in terms of a thickness of 100 μm, when shaped into a film.

[11] The acrylic thermoplastic resin composition according to any one of [1] to [10], in which an absolute value of retardation Rth in a thickness direction is 30 nm or less in terms of a thickness of 100 μm, when shaped into a film.

[12] The acrylic thermoplastic resin composition according to any one of [1] to [11], in which a glass-transition temperature Tg is 120° C. or more.

[13] The acrylic thermoplastic resin composition according to any one of [1] to [12], in which a total light transmittance is 85% or more in terms of a thickness of 100 μm, when shaped into a film.

[14] A shaped article comprising the acrylic thermoplastic resin composition according to any one of [1] to [13].

[15] A film-like or sheet-like shaped article comprising the acrylic thermoplastic resin composition according to any one of [1] to [13].

[16] A film-like or sheet-like shaped article prepared by stretching at least in a uniaxial direction a resin sheet comprising the acrylic thermoplastic resin according to any one of [1] to [13] and shaped by extrusion.

[17] A film-like or sheet-like shaped article prepared by stretching at least in a uniaxial direction a resin sheet comprising the acrylic thermoplastic resin according to any one of [1] to [13] and shaped by solution casting.

[18] A polarizing plate protection film comprising the shaped article according to any one of [14] to [17].

[19] A retardation film comprising the shaped article according to any one of [14] to [17].

[20] A retardation plate comprising the shaped article according to any one of [14] to [17].

[21] A transparent plastic substrate comprising the shaped article according to any one of [14] to [17].

[22] A lens comprising the shaped article according to any one of [14] to [17].

Advantageous Effects of Invention

The present invention can provide an acrylic thermoplastic resin composition which excels in transparency, heat resistance and weather resistance, and moreover, whose optical characteristics (birefringence and photoelastic coefficient) are highly controlled, and a shaped article comprising the acrylic thermoplastic resin composition.

DESCRIPTION OF EMBODIMENTS

Figure 1:
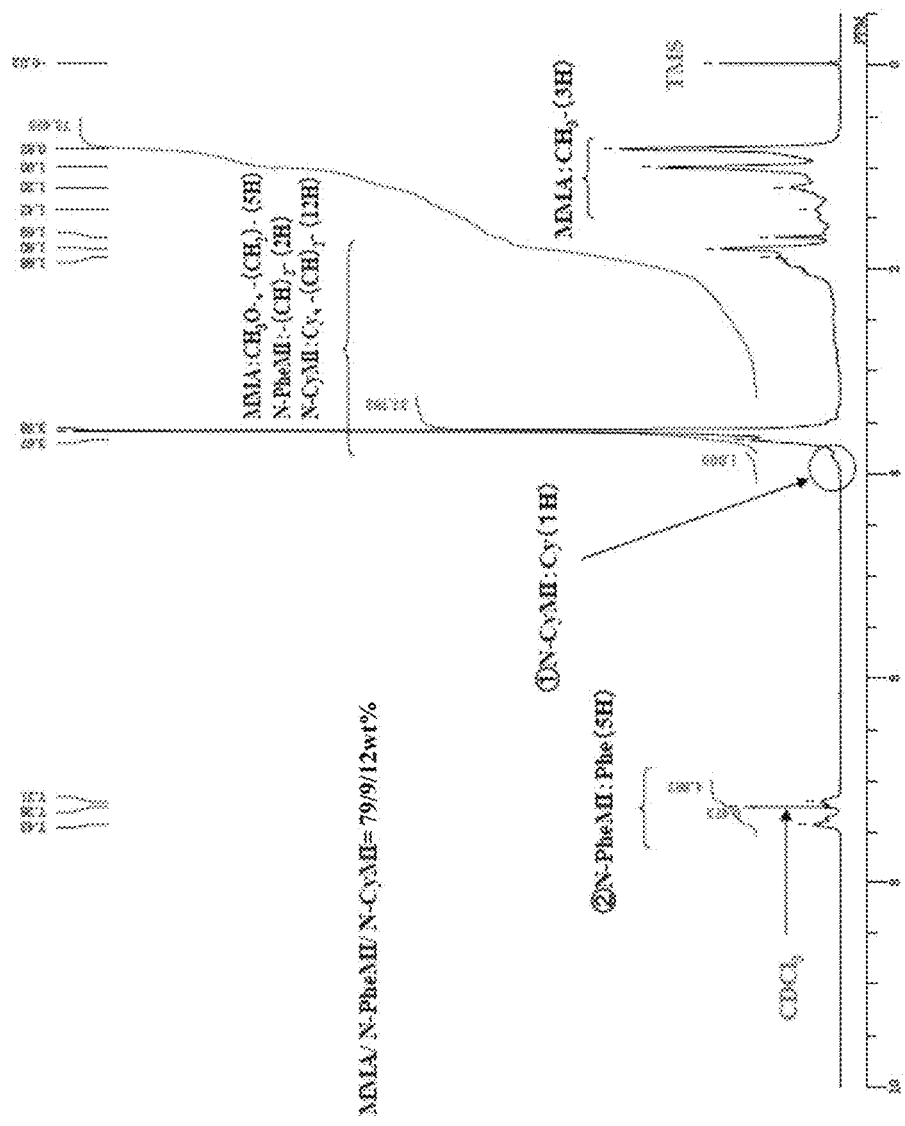
FIG. 1 is a diagram showing a $^1$H-NMR spectrum of an acrylic thermoplastic resin composition in Example 3.

Hereinafter, preferred embodiments of the present invention will be described.

[Acrylic Thermoplastic Resin Composition]

An acrylic thermoplastic resin composition according to the present embodiment contains a first acrylic resin having a first structural unit and a second structural unit, and a second acrylic resin having the first structural unit and a third structural unit.

In the acrylic thermoplastic resin composition according to the present embodiment, the total content of the first structural unit is 50 to 95 mass % and the total content of the second structural unit and the third structural unit is 5 to 50 mass % based on a total amount of the first acrylic resin and the second acrylic resin.

Hereinafter, one preferred embodiment of each of the first acrylic resin and the second acrylic resin will be described.

(First Acrylic Resin)

The first acrylic resin of the present embodiment has the first structural unit and the second structural unit.

(First Structural Unit)

The first structural unit is a structural unit represented by the following formula (1).

[Chemical Formula 4]

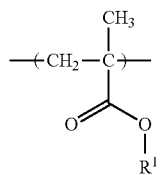

(1)

In the formula, $R^1$ represents a hydrogen atom, an alkyl group having 1 to 12 carbon atoms, a cycloalkyl group having 5 to 12 carbon atoms, an arylalkyl group having 7 to 14 carbon atoms, an aryl group having 6 to 14 carbon atoms, or an aryl group having 6 to 14 carbon atoms with at least one substituent selected from the following Group A. The Group A is the group consisting of a halogen atom, a hydroxyl group, a nitro group, an alkoxy group having 1 to 12 carbon atoms and an alkyl group having 1 to 12 carbon atoms.

It is to be noted that, in the present description, the alkyl group may be a linear or branched type. In addition, the alkyl group in the arylalkyl group and the alkyl group in the alkoxy group may be a linear or branched type.

As the alkyl group having 1 to 12 carbon atoms in $R^1$, an alkyl group having 1 to 6 carbon atoms is preferable, and an alkyl group having 1 to 4 carbon atoms is more preferable. In addition, examples of the alkyl group having 1 to 12 carbon atoms in $R^1$ include a methyl group, an ethyl group, a n-propyl group, an isopropyl group, a n-butyl group, an isobutyl group, a t-butyl group, a 2-ethylhexyl group, a nonyl group, a decanyl group and a lauryl group, and among these, a methyl group, an ethyl group, a n-propyl group, an isopropyl group, a n-butyl group, an isobutyl group, a t-butyl group and a 2-ethylhexyl group are preferable, and a methyl group is more preferable from the viewpoint of further improving transparency and weather resistance of the acrylic thermoplastic resin.

Moreover, examples of the cycloalkyl group having 5 to 12 carbon atoms in $R^1$ include a cyclopentyl group, a cyclohexyl group, a cycloheptyl group, a cyclooctyl group, a tricyclodecyl group, a bicyclooctyl group, a tricyclododecyl group, an isobornyl group, an adamantyl group, and a tetracyclododecyl group, and among these, a cyclopentyl group, a cyclohexyl group, a cyclooctyl group, a tricyclodecyl group, a bicyclooctyl group, a tricyclododecyl group, and an isobornyl group are preferable.

Moreover, examples of the arylalkyl group having 7 to 14 carbon atoms in $R^1$ include a benzyl group, a 1-phenylethyl group, a 2-phenylethyl group, a 3-phenylpropyl group, a 6-phenylhexyl group and a 8-phenyloctyl group, and among these, a benzyl group, a 1-phenylethyl group, a 2-phenylethyl group and a 3-phenylpropyl group are preferable.

Moreover, examples of the aryl group having 6 to 14 carbon atoms in $R^1$ include a phenyl group, a naphthyl group and an anthracenyl group, and among these, a phenyl group is preferable.

$R^1$ may be the aryl group having 6 to 14 carbon atoms with a substituent, and the substituent is selected from the group (Group A) consisting of a halogen atom, a hydroxyl group, a nitro group, an alkoxy group having 1 to 12 carbon atoms and an alkyl group having 1 to 12 carbon atoms.

As the aryl group having 6 to 14 carbon atoms with a substituent in $R^1$, a phenyl group with a substituent is preferable. In addition, examples of the aryl group having 6 to 14 carbon atoms with a substituent include a 2,4,6-tribromophenyl group, a 2-chlorophenyl group, a 4-chlorophenyl group, a 2-bromophenyl group, a 4-bromophenyl group, a 2-methylphenyl group, a 4-methylphenyl group, a 2-ethylphenyl group, a 4-ethylphenyl group, a 2-methoxyphenyl group, a 4-methoxyphenyl group, a 2-nitrophenyl group, a 4-nitrophenyl group and a 2,4,6-trimethylphenyl group, and among these, a 2,4,6-tribromophenyl group is preferable from the viewpoint of imparting flame retardancy.

The content of the first structural unit in the first acrylic resin is, based on a total amount of the first acrylic resin, preferably 50 to 95 mass %, more preferably 60 to 90 mass %, and further preferably 70 to 90 mass %.

The first acrylic resin may contain only one kind of the first structural unit or two or more kinds of the first structural unit.

For example, the first acrylic resin can have a structural unit in which $R^1$ is an alkyl group and a structural unit in which $R^1$ is an arylalkyl group or an aryl group. In this case, the content of the latter structural unit is, based on a total amount of the first acrylic resin, preferably 0.1 to 10 mass %, more preferably 0.1 to 8 mass %, and further preferably 0.1 to 6 mass %. According to the first acrylic resin within this range, an improvement effect of optical characteristics such as birefringence can be obtained without a significant decrease in heat resistance.

The first structural unit is, for example, formed of a first monomer selected from a methacrylate monomer and methacrylate esters. The first monomer can be represented by the following formula (1-a).

[Chemical Formula 5]

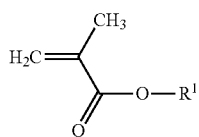

(1-a)

In the formula, $R^1$ is synonymous with $R^1$ in the formula (1).

Examples of the methacrylate esters include alkyl methacrylate esters such as methyl methacrylate, ethyl methacrylate, n-propyl methacrylate, isopropyl methacrylate, n-butyl methacrylate, isobutyl methacrylate, t-butyl methacrylate and 2-ethylhexyl methacrylate; cycloalkyl methacrylate esters such as cyclopentyl methacrylate, cyclohexyl methacrylate, cyclooctyl methacrylate, tricyclodecyl methacrylate, bicyclooctyl methacrylate, tricyclododecyl methacrylate and isobornyl methacrylate; and aryl methacrylate esters such as phenyl methacrylate, benzyl methacrylate, 1-phenylethyl methacrylate, 2-phenylethyl methacrylate, 3-phenylpropyl methacrylate and 2,4,6-tribromophenyl methacrylate. These first monomers may be used alone or in combination with two or more kinds thereof.

(Second Structural Unit)

The second structural unit is a structural unit represented by the following formula (2).

[Chemical Formula 6]

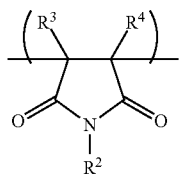

(2)

In the formula, $R^2$ represents an arylalkyl group having 7 to 14 carbon atoms, an aryl group having 6 to 14 carbon atoms, or an aryl group having 6 to 14 carbon atoms with at least one substituent selected from the following Group B, and $R^3$ and $R^4$ each independently represent a hydrogen atom, an alkyl group having 1 to 12 carbon atoms, or an aryl group having 6 to 14 carbon atoms. The Group B is the group consisting of a halogen atom, a hydroxyl group, a nitro group, an alkoxy group having 1 to 12 carbon atoms, an alkyl group having 1 to 12 carbon atoms and an arylalkyl group having 7 to 14 carbon atoms.

Examples of the arylalkyl group having 7 to 14 carbon atoms in $R^2$ include a benzyl group, a 1-phenylethyl group, a 2-phenylethyl group, a 3-phenylpropyl group, a 6-phenylhexyl group and a 8-phenyloctyl group, and among these, a benzyl group is preferable from the viewpoint of further improving optical characteristics such as heat resistance and a low birefringence.

Moreover, examples of the aryl group having 6 to 14 carbon atoms in $R^2$ include a phenyl group, a naphthyl group and an anthracenyl group, and among these, a phenyl group is preferable from the viewpoint of further improving optical characteristics such as heat resistance and a low birefringence.

Moreover, $R^2$ may be an aryl group having 6 to 14 carbon atoms with a substituent, and the substituent is selected from the group (Group B) consisting of a halogen atom, a hydroxyl group, a nitro group, an alkoxy group having 1 to 12 carbon atoms, an alkyl group having 1 to 12 carbon atoms and an arylalkyl group having 7 to 14 carbon atoms.

Examples of the halogen atom as the substituent include a fluorine atom, a chlorine atom, a bromine atom and an iodine atom.

As the alkoxy group having 1 to 12 carbon atoms as the substituent, an alkoxy group having 1 to 10 carbon atoms is preferable, and an alkoxy group having 1 to 8 carbon atoms is more preferable. In addition, examples of the alkoxy group having 1 to 12 carbon atoms as the substituent include a methoxy group, an ethoxy group, a n-propyloxy group, an isopropyloxy group, a n-butyloxy group, an isobutyloxy group, a t-butyloxy group, a 2-ethylhexyloxy group, a 1-decyloxy group and a 1-dodecyloxy group.

Examples of the alkyl group having 1 to 12 carbon atoms and the arylalkyl group having 7 to 14 carbon atoms as the substituent are the same as the examples of the alkyl group having 1 to 12 carbon atoms and the arylalkyl group having 7 to 14 carbon atoms in $R^1$.

As the aryl group having 6 to 14 carbon atoms with a substituent in $R^2$, a phenyl group with a substituent and a naphthyl group with a substituent are preferable. In addition, examples of the aryl group having 6 to 14 carbon atoms with a substituent include a 2,4,6-tribromophenyl group, a 2-chlorophenyl group, a 4-chlorophenyl group, a 2-bromophenyl group, a 4-bromophenyl group, a 2-methylphenyl group, a 4-methylphenyl group, a 2-ethylphenyl group, a 4-ethylphenyl group, a 2-methoxyphenyl group, a 4-methoxyphenyl group, a 2-nitrophenyl group, a 4-nitrophenyl group and a 2,4,6-trimethylphenyl group, and among these, a 2,4,6-tribromophenyl group is preferable from the viewpoint of imparting flame retardancy.

As the alkyl group having 1 to 12 carbon atoms in $R^3$ and $R^4$, an alkyl group having 1 to 6 carbon atoms is preferable, and an alkyl group having 1 to 4 carbon atoms is more preferable. In addition, examples of the alkyl group having 1 to 12 carbon atoms in $R^3$ and $R^4$ include a methyl group, an ethyl group, a n-propyl group, an isopropyl group, a n-butyl group, an isobutyl group, a t-butyl group, a 2-ethylhexyl group, a nonyl group, a decanyl group, and a lauryl group, and among these, a methyl group, an ethyl group, a n-propyl group, an isopropyl group, a n-butyl group, an isobutyl group, a t-butyl group, and a 2-ethylhexyl group are preferable, and a methyl group is more preferable from the viewpoint of further improving transparency and weather resistance of the acrylic thermoplastic resin.

Examples of the aryl group having 6 to 14 carbon atoms in $R^3$ and $R^4$ include a phenyl group, a naphthyl group and an anthracenyl group, and among these, a phenyl group is preferable from the viewpoint of further improving optical characteristics such as heat resistance and a low birefringence.

$R^3$ and $R^4$ are preferably a hydrogen atom, an alkyl group having 1 to 4 carbon atoms or a phenyl group, and are more preferably a hydrogen atom.

The content of the second structural unit in the first acrylic resin is, based on a total amount of the first acrylic resin, preferably 0.1 to 49.9 mass %, more preferably 0.1 to 35 mass %, and further preferably 0.1 to 20 mass %.

The first acrylic resin may contain only one kind of the second structural unit or two or more kinds of the second structural unit.

The second structural unit is, for example, formed of a second monomer selected from an N-substituted maleimide compound represented by the following formula (2-a).

[Chemical Formula 7]

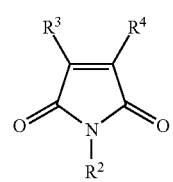

(2-a)

In the formula, $R^2$, $R^3$, and $R^4$ are synonymous with $R^2$, $R^3$, and $R^4$ in the formula (2), respectively.

Examples of the second monomer include N-phenylmaleimide, N-benzylmaleimide, N-(2-chlorophenyl)maleimide, N-(4-chlorophenyl)maleimide, N-(4-bromophenyl)maleimide, N-(2-methylphenyl)maleimide, N-(2-ethylphenyl)maleimide, N-(2-methoxyphenyl)maleimide, N-(2-nitrophenyl)maleimide, N-(2,4,6-trimethylphenyl)maleimide, N-(4-benzylphenyl)maleimide, N-(2,4,6-tribromophenyl)maleimide, N-naphthylmaleimide, N-anthracenylmaleimide, 3-methyl-1-phenyl-1H-pyrrol-2,5-dione, 3,4-dimethyl-1-phenyl-1H-pyrrol-2,5-dione, 1,3-diphenyl-1H-pyrrol-2,5-dione and 1,3,4-triphenyl-1H-pyrrol-2,5-dione. These second monomers may be used alone or in combination with two or more kinds thereof.

(Fourth Structural Unit)

The first acrylic resin may further contain a structural unit other than those described above. For example, the first acrylic resin may further contain a structural unit derived from any other monomer copolymerizable with the above-described first monomer and second monomer within the range not impairing the object of the invention. Hereinafter, among the structural units in the first acrylic resin, a structural unit that is not applicable to any of the above-described first structural unit, the above-described second structural unit and a third structural unit described below will be referred to as a fourth structural unit.

Examples of any other copolymerizable monomer include aromatic vinyls; unsaturated nitriles; acrylic acid esters having a cyclohexyl group, a benzyl group, or an alkyl group having 1 to 18 carbon atoms; olefins; dienes; vinyl ethers; vinyl esters; vinyl fluorides; allyl esters or methallyl esters of saturated fatty monocarbonic acids such as allyl propionate; poly(meth)acrylates; polyarylates; glycidyl compounds; and unsaturated carboxylic acids. Any other monomer may be one kind or a combination of two or more kinds selected from these groups.

Examples of the above-described aromatic vinyls include styrene, α-methylstyrene and divinylbenzene. Examples of the above-described unsaturated nitriles include acrylonitrile, methacrylonitrile, ethacrylonitrile and phenylacrylonitrile. In addition, examples of the above-described acrylic acid esters include methyl acrylate, ethyl acrylate, propyl acrylate, isopropyl acrylate, butyl acrylate, isobutyl acrylate, t-butyl acrylate, amyl acrylate, isoamyl acrylate, octyl acrylate, 2-ethylhexyl acrylate, decyl acrylate, lauryl acrylate, cyclohexyl acrylate and benzyl acrylate.

In addition, examples of the above-described olefins include ethylene, propylene, isobutylene and diisobutylene. In addition, examples of the above-described dienes include butadiene and isoprene. In addition, examples of the above-described vinyl ethers include methyl vinyl ether and butyl vinyl ether. In addition, examples of the above-described vinyl esters include vinyl acetate and vinyl propionate. In addition, examples of the above-described vinyl fluorides include vinylidene fluoride.

Examples of the above-described poly(meth)acrylates include ethylene glycol (meth)acrylate, diethylene glycol (meth)acrylate, trimethylolpropane tri(meth)acrylate, hexanediol di(meth)acrylate, pentaerythritol tetra(meth)acrylate, dipentaerythritol hexa(meth)acrylate, di(meth)acrylate of an ethylene oxide or propylene oxide adduct of bisphenol A, di(meth)acrylate of an ethylene oxide or propylene oxide adduct of halogenated bisphenol A, di or tri(meth)acrylate of an ethylene oxide or propylene oxide adduct of isocyanurate.

Examples of the polyarylate monomer include diallyl phthalate and triallyl isocyanurate. Examples of the glycidyl compound monomer include glycidyl (meth)acrylate and allyl glycidyl ether. Examples of the unsaturated carboxylic acid monomer include acrylic acid, methacrylic acid, itaconic acid, maleic acid, fumaric acid, and a half-esterification product or anhydride thereof.

The content of the fourth structural unit in the first acrylic resin is, based on a total amount of the first acrylic resin, preferably 0.1 to 20 mass %, more preferably 0.1 to 15 mass %, and further preferably 0.1 to 10 mass %. When the content of the fourth structural unit is within the above-described range, hygroscopicity of the acrylic thermoplastic resin composition is improved. From the viewpoint of weather resistance, the content of the fourth structural unit is preferably less than 10 mass %, and more preferably less than 7 wt %.

The first acrylic resin may contain only one kind of the fourth structural unit or two or more kinds of the fourth structural unit.

One example of the fourth structural unit is a structural unit represented by the following formula (4).

[Chemical Formula 8]

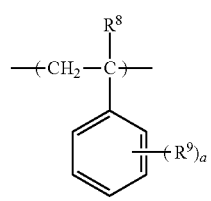

(4)

In the formula, $R^8$ represents a hydrogen atom or an alkyl group having 1 to 12 carbon atoms, $R^9$ represents a halogen atom, a hydroxyl group, a nitro group, an alkyl group having 1 to 12 carbon atoms or an alkoxy group having 1 to 12 carbon atoms, and a represents an integer of 1 to 3.

As the alkyl group having 1 to 12 carbon atoms in $R^8$, an alkyl group having 1 to 10 carbon atoms is preferable, and an alkyl group having 1 to 8 carbon atoms is more preferable. In addition, examples of the alkyl group having 1 to 12 carbon atoms in $R^8$ include a methyl group, an ethyl group, a n-propyl group, an isopropyl group, a n-butyl group, an isobutyl group, a t-butyl group, a 2-ethylhexyl group, a 1-decyl group and a 1-dodecyl group, and among these, a methyl group is preferable.

Examples of the halogen atom in $R^9$ include a fluorine atom, a chlorine atom, a bromine atom and an iodine atom.

Moreover, as the alkyl group having 1 to 12 carbon atoms in $R^9$, an alkyl group having 1 to 10 carbon atoms is preferable, and an alkyl group having 1 to 8 carbon atoms is more preferable. In addition, examples of the alkyl group having 1 to 12 carbon atoms in $R^9$ include a methyl group, an ethyl group, a n-propyl group, an isopropyl group, a n-butyl group, an isobutyl group, a t-butyl group, a 2-ethylhexyl group, a 1-decyl group and a 1-dodecyl group, and among these, a methyl group, an ethyl group, a n-propyl group, an isopropyl group, a n-butyl group, an isobutyl group, a t-butyl group and a 2-ethylhexyl group are preferable, and a methyl group is more preferable from the viewpoint of further improving transparency and weather resistance of the acrylic thermoplastic resin.

Moreover, as the alkoxy group having 1 to 12 carbon atoms in $R^9$, an alkoxy group having 1 to 10 carbon atoms is preferable, and an alkoxy group having 1 to 8 carbon atoms is more preferable. In addition, examples of the alkoxy group having 1 to 12 carbon atoms as a substituent include a methoxy group, an ethoxy group, a n-propyl oxy group, an isopropyl oxy group, a n-butyl oxy group, an isobutyl oxy group, a t-butyl oxy group, a 2-ethylhexyl oxy group, a 1-decyloxy group and a 1-dodecyloxy group, and among these, a methoxy group is preferable.

The structural unit represented by the formula (4) can be, for example, formed of a monomer represented by the following formula (4-a).

[Chemical Formula 9]

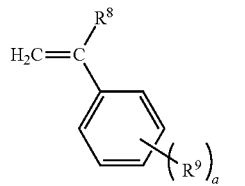

(4-a)

In the formula, $R^8$, $R^9$ and a are synonymous with $R^8$, $R^9$ and a in the formula (4), respectively.

Examples of the monomer represented by the formula (4-a) include styrene, 2-methylstyrene, 3-methylstyrene, 4-methylstyrene, 2,4-dimethyl styrene, 2,5-dimethylstyrene, 2-methyl-4-chlorostyrene, 2,4,6-trimethylstyrene, α-methylstyrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluorostyrene, 4-fluorostyrene, 2,4-difluorostyrene, 2-chlorostyrene, 3-chlorostyrene, 4-chlorostyrene, 2,4-dichlorostyrene, 2,6-dichlorostyrene, 2-bromostyrene, 3-bromostyrene, 4-bromostyrene, 2,4-dibromostyrene, α-bromostyrene, β-bromostyrene, 2-hydroxystyrene and 4-hydroxystyrene, and among these, styrene and α-methylstyrene are preferable because of easiness of copolymerization. These monomers may be used alone or in combination with two or more kinds thereof.

The first acrylic resin preferably has a weight average molecular weight Mw of 3000 to 1000000 in terms of polymethyl methacrylate by a GPC measuring method. When the weight average molecular weight Mw is within the above-described range, sufficient strength can be imparted to the acrylic thermoplastic resin composition, and strength of a shaped article of the acrylic thermoplastic resin composition is improved. The weight average molecular weight Mw is more preferably 4000 to 800000, and further preferably 5000 to 500000.

The first acrylic resin preferably has molecular weight distribution (Mw/Mn) of 1 to 10 in terms of polymethyl methacrylate by a GPC measuring method, and the molecular weight distribution (Mw/Mn) is more preferably 1.1 to 7.0, further preferably 1.2 to 5.0, and can also be 1.5 to 4.0 from the viewpoint of imparting resin viscosity suitable for a shaping processing to the acrylic thermoplastic resin composition.

The first acrylic resin preferably has a glass-transition temperature (Tg) of 120° C. or more. When Tg is 120° C. or more, the first acrylic resin has necessary and sufficient heat resistance as lens shaped articles and film shaped articles for liquid crystal displays in recent years. Tg is preferably 130° C. or more, and more preferably 135° C. or more. In contrast, the upper limit of Tg is preferably 180° C. or less.

One preferred aspect of the first acrylic resin will be described below.

The first acrylic resin of the present aspect is a resin composed of structural units selected from the group consisting of the first structural unit, the second structural unit and the fourth structural unit, and the content of the first structural unit is 50 to 95 mass %, the content of the second structural unit is 5 to 50 mass % and the content of the fourth structural unit is 0 to 20 mass %, based on a total amount of the first acrylic resin.

Since the first acrylic resin of the present aspect is composed of the structural units selected from the group consisting of the first structural unit, the second structural uni, and the fourth structural unit, other than for both terminals, and the total content of the first structural unit, the second structural unit and the fourth structural unit is approximately 100 mass %.

The first acrylic resin of the present aspect is preferably used in combination with one preferred aspect of the second acrylic resin described below. The effects of the present invention are thereby more significantly achieved.

(Second Acrylic Resin)

The second acrylic resin of the present embodiment has the first structural unit and the third structural unit.

(First Structural Unit)

The first structural unit of the second acrylic resin can be shown in the same manner as the structural unit shown as the first structural unit of the first acrylic resin.

The content of the first structural unit in the second acrylic resin is, based on a total amount of the second acrylic resin, preferably 50 to 95 mass %, more preferably 60 to 90 mass %, and further preferably 70 to 90 mass %.

The second acrylic resin may contain only one kind of the first structural unit or two or more kinds of the first structural unit. In addition, as the first structural unit, the second acrylic resin may contain the same structural unit as the first structural unit contained in the first acrylic resin or a different structural unit from the first structural unit contained in the first acrylic resin.

(Third Structural Unit)

The third structural unit is a structural unit represented by the following formula (3).

[Chemical Formula 10]

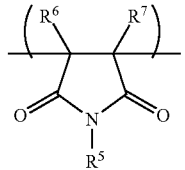

(3)

In the formula, $R^5$ represents a hydrogen atom, a cycloalkyl group having 3 to 12 carbon atoms, an alkyl group having 1 to 12 carbon atoms, or an alkyl group having 1 to 12 carbon atoms with at least one substituent selected from the following Group C, and $R^6$ and $R^7$ each independently represent a hydrogen atom, an alkyl group having 1 to 12 carbon atoms or an aryl group having 6 to 14 carbon atoms. The Group C is the group consisting of a halogen atom, a hydroxyl group, a nitro group and an alkoxy group having 1 to 12 carbon atoms.

Examples of the cycloalkyl group having 3 to 12 carbon atoms in $R^5$ include a cyclopropyl group, a cyclobutyl group, a cyclopentyl group, a cyclohexyl group, a cycloheptyl group, a cyclooctyl group, a tricyclodecyl group, a bicyclooctyl group, a tricyclododecyl group, an isobornyl group, an adamantyl group and a tetracyclododecyl group, among these, a cyclopropyl group, a cyclobutyl group, a cyclopentyl group, a cyclohexyl group, a cycloheptyl group and a cyclooctyl group are preferable and a cyclohexyl group is more preferable from the viewpoints of further improving optical characteristics such as weather resistance and transparency of the acrylic thermoplastic resin composition and imparting low water absorbability to the acrylic thermoplastic resin composition.

As the alkyl group having 1 to 12 carbon atoms in $R^5$, an alkyl group having 1 to 10 carbon atoms is preferable, and an alkyl group having 1 to 8 carbon atoms is more preferable. In addition, examples of the alkyl group having 1 to 12 carbon atoms in $R^5$ include a methyl group, an ethyl group, a n-propyl group, an isopropyl group, a n-butyl group, an isobutyl group, a t-butyl group, a n-pentyl group, a n-hexyl group, a n-octyl group, a n-dodecyl group, a n-octadecyl group, a 2-ethylhexyl group, a 1-decyl group and a 1-dodecyl group, and among these, a methyl group, an ethyl group and an isopropyl group are preferable from the viewpoint of further improving optical characteristics such as weather resistance and transparency of the acrylic thermoplastic resin composition.

Moreover, $R^5$ may be an alkyl group having 1 to 12 carbon atoms with a substituent, and the substituent is selected from the group (Group C) consisting of a halogen atom, a hydroxyl group, a nitro group and an alkoxy group having 1 to 12 carbon atoms.

Examples of the halogen atom as the substituent include a fluorine atom, a chlorine atom, a bromine atom and an iodine atom.

As the alkoxy group having 1 to 12 carbon atoms as the substituent, an alkoxy group having 1 to 10 carbon atoms is preferable, and an alkoxy group having 1 to 8 carbon atoms is more preferable. In addition, examples of the alkoxy group having 1 to 12 carbon atoms as the substituent include a methoxy group, an ethoxy group, a n-propyl oxy group, an isopropyl oxy group, a n-butyl oxy group, an isobutyl oxy group, a t-butyl oxy group, a 2-ethylhexyl oxy group, a 1-decyloxy group and a 1-dodecyloxy group.

Examples of the alkyl group having 1 to 12 carbon atoms with a substituent in $R^5$ include a dichloromethyl group, a trichloromethyl group, a trifluoroethyl group and a hydroxyethyl group, and among these, a trifluoroethyl group is preferable.

As the alkyl group having 1 to 12 carbon atoms in $R^6$ and $R^7$, an alkyl group having 1 to 6 carbon atoms is preferable, and an alkyl group having 1 to 4 carbon atoms is more preferable. In addition, examples of the alkyl group having 1 to 12 carbon atoms in $R^6$ and $R^7$ include a methyl group, an ethyl group, a n-propyl group, an isopropyl group, a n-butyl group, an isobutyl group, a t-butyl group, a 2-ethylhexyl group, a nonyl group, a decanyl group and a lauryl group, and among these, a methyl group, an ethyl group, a n-propyl group, an isopropyl group, a n-butyl group, an isobutyl group, a t-butyl group and a 2-ethylhexyl group are preferable, and a methyl group is more preferable from the viewpoint of further improving transparency and weather resistance of the acrylic thermoplastic resin.

Examples of the aryl group having 6 to 14 carbon atoms in $R^6$ and $R^7$ include a phenyl group, a naphthyl group and an anthracenyl group, and among these, a phenyl group is preferable from the viewpoint of further improving optical characteristics such as heat resistance and a low birefringence.

$R^6$ and $R^7$ are preferably a hydrogen atom, an alkyl group having 1 to 4 carbon atoms, or a phenyl group, and are more preferably a hydrogen atom.

The content of the third structural unit in the second acrylic resin is, based on a total amount of the second acrylic resin, preferably 0.1 to 49.9 mass %, more preferably 0.1 to 40 mass %, and further preferably 0.1 to 35 mass %.

The second acrylic resin may contain only one kind of the third structural unit or two or more kinds of the third structural unit.

The third structural unit is, for example, formed of a third monomer selected from an N-substituted maleimide compound represented by the following formula (3-a).

[Chemical Formula 11]

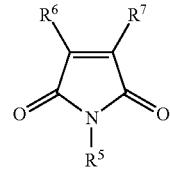

(3-a)

In the formula, $R^5$, $R^6$, and $R^7$ are synonymous with $R^5$, $R^6$, and $R^7$ in the formula (3), respectively.

Examples of the third monomer include N-methylmaleimide, N-ethylmaleimide, N-n-propylmaleimide, N-isopropylmaleimide, N-n-butylmaleimide, N-isobutylmaleimide, N-s-butylmaleimide, N-t-butylmaleimide, N-n-pentylmaleimide, N-n-hexylmaleimide, N-n-heptylmaleimide, N-n-octylmaleimide, N-laurylmaleimide, N-stearylmaleimide, N-cyclopropylmaleimide, N-cyclobutylmaleimide, N-cyclopentylmaleimide, N-cyclohexylmaleimide, N-cycloheptylmaleimide, N-cyclooctylmaleimide, 1-cyclohexyl-3-methyl-1H-pyrrol-2,5-dione, 1-cyclohexyl-3,4-dimethyl-1H-pyrrol-2,5-dione, 1-cyclohexyl-3-phenyl-1H-pyrrol-2,5-dione and 1-cyclohexyl-3,4-diphenyl-1H-pyrrol-2,5-dione. These third monomers may be used alone or in combination with two or more kinds thereof.

(Fourth Structural Unit)

The second acrylic resin may contain a monomer other than described above. For example, the second acrylic resin may further contain a structural unit derived from any other monomer copolymerizable with the above-described first monomer and the above-described third monomer within the range not impairing the object of the invention. Hereinafter, a structural unit other than the first, second and third structural units in the second acrylic resin will be referred to as a fifth structural unit.

As the fifth structural unit contained in the second acrylic resin, the same as the structural unit shown as the fourth structural unit contained in the first acrylic resin can be shown.

The second acrylic resin may contain only one kind of the fifth structural unit or two or more kinds of the fifth structural unit. In addition, as the fifth structural unit, the second acrylic resin may contain the same structural unit as the fourth structural unit of the first acrylic resin or a different structural unit from the fourth structural unit of the first acrylic resin.

The content of the fifth structural unit in the second acrylic resin is, based on a total amount of the second acrylic resin, preferably 0.1 to 20 mass %, more preferably 0.1 to 15 mass %, and further preferably 0.1 to 10 mass %. When the content of the fifth structural unit is within the above-described range, hygroscopicity of the acrylic thermoplastic resin composition is improved. From the viewpoint of weather resistance, the content of the fifth structural unit is preferably less than 10 mass %, and more preferably less than 7 wt %.

The second acrylic resin preferably has a weight average molecular weight Mw of 3000 to 1000000 in terms of polymethyl methacrylate by a GPC measuring method. When the weight average molecular weight Mw is within the above-described range, sufficient strength can be imparted to the acrylic thermoplastic resin composition, and strength of a shaped article of the acrylic thermoplastic resin composition is improved. The weight average molecular weight Mw is more preferably 4000 to 800000, and further preferably 5000 to 500000.

The second acrylic resin preferably has molecular weight distribution (Mw/Mn) of 1 to 10 in terms of polymethyl methacrylate by a GPC measuring method, and the molecular weight distribution (Mw/Mn) is more preferably 1.1 to 7.0, further preferably 1.2 to 5.0, and can also be 1.5 to 4.0 from the viewpoint of imparting resin viscosity suitable for a shaping processing to the acrylic thermoplastic resin composition.

The second acrylic resin preferably has a glass-transition temperature (Tg) of 120° C. or more. When Tg is 120° C. or more, the second acrylic resin has necessary and sufficient heat resistance as lens-shaped articles and film-shaped articles for liquid crystal displays in recent years. Tg is preferably 130° C. or more, and more preferably 135° C. or more. In contrast, the upper limit of Tg is preferably 180° C. or less.

One preferred aspect of the second acrylic resin will be described below.

The second acrylic resin of the present aspect is a resin composed of structural units selected from the group consisting of the first structural unit, the third structural unit and the fifth structural unit, and the content of the first structural unit is 50 to 95 mass %, the content of the third structural unit is 5 to 50 mass %, and the content of the fifth structural unit is 0 to 20 mass % based on a total amount of the second acrylic resin.

Since the second acrylic resin of the present aspect is composed of the structural units selected from the group consisting of the first structural unit, the third structural unit and the fifth structural unit, other than for both terminals, and the total content of the first structural unit, the third structural unit and the fifth structural unit is approximately 100 mass %.

The second acrylic resin of the present aspect is preferably used in combination with the above-described one preferred aspect of the first acrylic resin. The effects of the present invention are thereby more significantly achieved.

(Manufacturing Method of First Acrylic Resin and Second Acrylic Resin)

Both of the first acrylic resin and the second acrylic resin can be obtained by the following polymerization step. Furthermore, the first acrylic resin and the second acrylic resin can be purified by the following devolatilization step.

(Polymerization Step)

The first acrylic resin can be obtained by polymerization of a monomer (A) containing the first monomer and the second monomer. Moreover, the second acrylic resin can be obtained by polymerization of a monomer (B) containing the first monomer and the third monomer. As the polymerization method, for example, generally performed polymerization methods such as cast polymerization, bulk polymerization, suspension polymerization, solution polymerization, emulsion polymerization, living radical polymerization and anionic polymerization can be used.

When the acrylic thermoplastic resin composition is used for optical material applications, it is preferable that contamination by minute foreign substances be avoided as much as possible, and from this viewpoint, cast polymerization and solution polymerization, which do not use a suspending agent or an emulsifying agent, are preferably used for the polymerization method of the acrylic resin.

In addition, as a manner of polymerization, for example, both of a batch polymerization method and a continuous polymerization method can be used. From the viewpoint of easiness of a polymerization operation, a batch polymerization method is preferable, and from the viewpoint that a polymer having a more uniform composition is obtained, a continuous polymerization method is preferably used.

The temperature and the polymerization time in a polymerization reaction can be appropriately adjusted in accordance with the kind and the ratio of monomers to be used, and for example, the polymerization temperature is 0 to 150° C. and the polymerization time is 0.5 to 24 hours, and preferably, the polymerization temperature is 80 to 150° C. and the polymerization time is 1 to 12 hours.

In the case of using a solvent in the polymerization reaction, examples of the polymerization solvent include aromatic hydrocarbon solvents such as toluene, xylene and ethylbenzene; ketone solvents such as methyl ethyl ketone and methyl isobutyl ketone; and ether solvents such as tetrahydrofuran. These solvents may be used alone or in combination with two or more kinds thereof. A solvent having a boiling point of 50 to 200° C. is preferable because, if the boiling point of the solvent to be used is too high, residual volatile contents in the finally obtained acrylic thermoplastic resin composition increases.

In the polymerization reaction, a polymerization initiator may be added as necessary. An arbitrary initiator which is generally used in radical polymerization can be used as the polymerization initiator, and examples thereof include organic peroxides such as cumene hydroperoxide, diisopropylbenzene hydroperoxide, di-t-butyl peroxide, lauroyl peroxide, benzoyl peroxide, t-butyl peroxyisopropylcarbonate and t-amyl peroxy-2-ethylhexanoate; and azo compounds such as 2,2'-azobis(isobutyronitrile), 1,1'-azobis(cyclohexanecarbonitrile), 2,2'-azobis(2,4-dimethylvaleronitrile) and dimethyl-2,2'-azobisisobutyrate. These polymerization initiators may be used alone or in combination with two or more kinds thereof.

The amount of the polymerization initiator used may be appropriately set in accordance with combination or reaction conditions of the monomer, and the polymerization initiator is preferably used in the range of 0.005 to 5 mass % although not being particularly limited.

As a molecular weight regulator used in the polymerization reaction as necessary, an arbitrary molecular weight regulator used in general radical polymerization is used, and particularly preferable examples thereof include mercaptan compounds such as butyl mercaptan, octyl mercaptan, dodecyl mercaptan and 2-ethylhexyl thioglycolate. These molecular weight regulators are added in a concentration range which controls the degree of polymerization within the above-described range.

Moreover, in the polymerization reaction, an organic phosphorous compound or an organic acid may be added as necessary. By the coexistence of these compounds, preferable effects of suppressing a side reaction, reducing the amount of the unreacted N-substituted maleimide, and the like can be promised. Accordingly, when performing the shaping processing of the obtained acrylic resin or the acrylic thermoplastic resin composition containing it, coloration during the processing may be decreased.

Examples of the organic phosphorous compound include alkyl(aryl)phosphonous acid and a diester or a monoester thereof; dialkyl(aryl)phosphinic acid and an ester thereof; alkyl(aryl)phosphonic acid and a diester or a monoester thereof; alkyl phosphinous acid and an ester thereof; phosphorous acid diester, phosphorous acid monoester, and phosphorous acid triester; and phosphoric acid diester, phosphoric acid monoester, and phosphoric acid triester. These organic phosphorous compounds may be used alone or in combination with two or more kinds thereof. The amount of the organic phosphorous compounds used is preferably 0.001 to 5.0 mass % with respect to the total amount of the monomer.

In contrast, examples of the organic acid include acetic acid, propionic acid, butyric acid, valeric acid, caproic acid, caprylic acid, capric acid, lauric acid, stearic acid, oleic acid, linoleic acid, linolenic acid, benzoic acid, cyclohexane carboxylic acid, phthalic acid, isophthalic acid, terephthalic acid, and an acid anhydride thereof. These organic acid may be used alone or in combination with two or more kinds thereof. The amount of the organic acid used is preferably 0.001 to 1.0 mass % with respect to the total amount of the monomer.

The polymerization reaction is preferably performed at a polymer concentration of 10 mass % or more and 95 mass % or less. When the polymer concentration is 10 mass % or more, the adjustment of a molecular weight and molecular weight distribution is easy, and when the polymer concentration is 95 mass % or less, a polymer having a high molecular weight can be obtained. Moreover, the polymer concentration is controlled to be preferably 75 mass % or less, and more preferably 60 mass % or less from the viewpoint of heat removal control of polymerization reaction heat.

In contrast, from the viewpoint of appropriately maintaining the viscosity of the obtained polymerization reaction solution, it is preferable that a polymerization solvent be appropriately added. By appropriately maintaining the viscosity of the reaction solution, heat removal can be easily controlled and generation of microgel in the reaction solution can be suppressed. In particular, in the latter half of the polymerization reaction in which the viscosity increases, it is preferable that the polymer concentration be controlled to be 50 mass % or less by appropriately adding the polymerization solvent.

The manner in which the polymerization solvent is appropriately added to the polymerization reaction solution is not particularly limited, and for example, the polymerization solvent may be added continuously or the polymerization solvent may be added intermittently. In this manner, by controlling the concentration of the acrylic resin produced in the polymerization reaction solution, temperature uniformity in a reactor can be improved and gelation of the reaction solution can be suppressed more sufficiently. Although the polymerization solvent to be added may be, for example, the same kind of solvent as the solvent used when being charged in the early phase of the polymerization reaction or a different kind of solvent therefrom, the same kind of solvent as the solvent used when being charged in the early phase of the polymerization reaction is preferably used. In addition, the polymerization solvent to be added may be a single solvent of one kind or a mixed solvent of two or more kinds.

When the acrylic resin is polymerized by a suspension polymerization method, the polymerization is performed in an aqueous medium by adding a suspending agent and a suspending auxiliary agent as necessary. Examples of the suspending agent include water-soluble polymers such as polyvinyl alcohol, methylcellulose and polyacrylamide, and inorganic substances such as calcium phosphate and magnesium pyrophosphate. It is preferable that 0.03 to 1 mass % of the water-soluble polymer be used with respect to the total amount of the monomer, and it is preferable that 0.05 to 0.5 mass % of the inorganic substance be used with respect to the total amount of the monomer. Examples of the suspending auxiliary agent include anionic surfactants such as sodium dodecylbenzenesulfonate, and when the inorganic substance is used as the suspending agent, the suspending auxiliary agent is preferably used. It is preferable that 0.001 to 0.02 mass % of the suspending auxiliary agent be used with respect to the total amount of the monomer.

(Devolatilization Step)

The devolatilization step means a step of performing removal treatment of volatile contents such as a polymerization solvent, a residual monomer and water in a condition of heating under reduced pressure, as necessary. If this removal treatment is insufficient, residual volatile contents in the obtained acrylic resin increases, coloration due to transformation or the like in shaping or shaping defects such as bubbles and silver streaks may be caused. The amount of the residual volatile contents is preferably 0.5 mass % or less, more preferably 0.4 mass % or less, and further more preferably 0.3 mass % or less with respect to 100 mass % of the acrylic resin. The amount of the residual volatile contents corresponds to the total amount of a residual monomer which is not reacted during the above-described polymerization reaction, the polymerization solvent and a side reaction product.

Examples of a device used in the devolatilization step include a devolatilization device composed of a heat exchanger and a devolatilization tank; a vented extruder; and a devolatilization device arranged in series with an extruder. When the vented extruder is used, it may have one vent or several vents, and it preferably has several vents.

The temperature in the devolatilization step is preferably 150 to 350° C., more preferably 170 to 330° C., and further preferably 200 to 300° C. When this temperature is less than 150° C., the residual volatile contents may increase. On the other hand, when this temperature is more than 350° C., coloration or decomposition of the obtained acrylic resin may be caused.

The pressure in the devolatilization step is preferably 931 to 1.33 hPa (700 to 1 mmHg), more preferably 800 to 13.3 hPa (600 to 10 mmHg), and further preferably 667 to 20.0 hPa (500 to 15 mmHg). When this pressure is more than 931 hPa (700 mmHg), volatile contents may easily remain. On the other hand, when the pressure is less than 1.33 hPa (1 mmHg), industrial practice may become difficult.

The treatment time is appropriately selected depending on the amount of the residual volatile contents, and shorter time is preferable for suppressing coloration or decomposition of the obtained acrylic resin.

When the monomer reaction conversion ratio in the polymerization reaction is low, a large number of unreacted monomers remain in the polymerization solution. In this case, treatment at a high temperature for a long time is performed to reduce the amount of the residual volatile contents in the obtained acrylic resin, but there is a problem in that coloration or decomposition is easy to occur. In the case of treating the polymerization reaction solution containing a large number of unreacted monomers, the controversial monomers can be removed from the polymerization reaction solution, for example, by performing pretreatment of adding an aromatic hydrocarbon solvent, a hydrocarbon solvent or an alcohol solvent to the polymerization solution, thereafter performing homogenizer (emulsification dispersion) treatment, and performing liquid-liquid extraction or solid-liquid extraction of the unreacted monomers. When the polymerization reaction solution after removing the monomers by the pretreatment is subjected to the above-described devolatilization step, the total of the monomers remaining in 100 mass % of the obtained acrylic resin can be easily reduced to 0.5 mass % or less.

The smaller number of foreign substances contained in the acrylic resin is more preferable for optical applications. Examples of a method of reducing the number of foreign substances include a method of filtering a solution or melt of the acrylic resin, for example, through a leaf disc-type polymer filter having filtration accuracy of 1.5 to 15 μm in the polymerization reaction step, the devolatilization step, and a shaping step described below.

(Acrylic Thermoplastic Resin Composition)

The acrylic thermoplastic resin composition contains the first acrylic resin and the second acrylic resin, and based on a total amount of the first acrylic resin and the second acrylic resin, the total content of the first unit is 50 to 95 mass % and the total content of the second structural unit and the third structural unit is 5 to 50 mass %.

The acrylic thermoplastic resin composition contains, as essential components, the second structural unit derived from the first acrylic resin and the third structural unit derived from the second acrylic resin. According to such a configuration, the acrylic thermoplastic resin composition can obtain excellent transparency and heat resistance, and exhibits good weather resistance. Furthermore, as preferable effects, optical characteristics (birefringence and photoelastic coefficient) described below can be highly controlled to a significant value (positive/negative/zero). In other words, in the resin composition containing only either one of the first acrylic resin and the second acrylic resin, only insufficient transparency, heat resistance and weather resistance are obtained, and moreover, control of optical characteristics falls outside a satisfactory range.

Since transparency and weather resistance of the acrylic thermoplastic resin composition are further improved, it is preferable that the first acrylic resin and the second acrylic resin be thermodynamically compatible with each other.

A blending ratio (mass ratio) of the first acrylic resin to the second acrylic resin in the acrylic thermoplastic resin composition is preferably within the range of 1/99 to 99/1, and more preferably within the range of 5/95 to 95/5. If the blending ratio is freely modified within the range of the present invention in accordance with necessary heat resistance and optical characteristics (birefringence and photoelastic coefficient), other physical properties such as transparency and weather resistance are not impaired.

On the other hand, workability of the obtained acrylic thermoplastic resin composition in shaping may be improved. In this case, by making a weight average molecular weight of the first acrylic resin and a weight average molecular weight of the second acrylic resin have different values, workability of the acrylic thermoplastic resin composition in shaping can be improved.

Specifically, by making a difference between the weight average molecular weight of the first acrylic resin and the weight average molecular weight of the second acrylic resin (hereinafter referred to as "average molecular weight difference" in some cases) be 10000 or more, workability of the acrylic thermoplastic resin composition in shaping can be improved. From the viewpoint of further improving workability, the average molecular weight difference is more preferably 15000 or more, and further preferably 20000 or more.

In the acrylic thermoplastic resin composition having the average molecular weight difference of 10000 or more, when a glass-transition temperature of the first acrylic resin and a glass-transition temperature of the second acrylic resin are compared, and the acrylic resin having the higher glass-transition temperature is defined as "high Tg resin" and the acrylic resin having the lower glass-transition temperature is defined as "low Tg resin," it is preferable that the weight average molecular weight of the high Tg resin be smaller than the weight average molecular weight of the low Tg resin. In the case where the average molecular weight difference is 10,000 or more and the weight average molecular weight of the high Tg resin is larger than the weight average molecular weight of the low Tg resin, uniformity during melt mixing decreases, and poor appearance of the shaped article may occur. In contrast, by the above-described combination satisfying the relation between the Tg and the weight average molecular weight, uniformity during melt mixing can be obtained more reliably and occurrence of poor appearance of the shaped article can be prevented more reliably.

An acrylic resin having a relatively low weight average molecular weight (hereinafter, referred to as "low molecular weight body" in some cases) is a factor affecting fluidity of the acrylic thermoplastic resin composition, and an acrylic resin having a relatively high weight average molecular weight (hereinafter, referred to as "high molecular weight body" in some cases) is a factor affecting mechanical strength of the shaped article formed of the acrylic thermoplastic resin composition. In addition, a mixing state of the first acrylic resin and the second acrylic resin affects transparency or appearance of the shaped article.

In order to obtain further excellent workability without impairing transparency of the acrylic thermoplastic resin composition, the weight average molecular weight of the high Tg resin is preferably 5000 to 400000 (more preferably 10000 to 300000, and further preferably 20000 to 250000), the weight average molecular weight of the low Tg resin is preferably 80000 to 800000 (more preferably 90000 to 500000, and further preferably 100000 to 400000), and the weight average molecular weight of the low Tg resin is preferably larger than the weight average molecular weight of the high Tg resin by 10000 or more.

When the weight average molecular weight of the high Tg resin is less than 5000, an improvement effect of workability is poor, and when that is more than 400000, deterioration of workability due to the decrease in fluidity may be caused. In addition, when the weight average molecular weight of the low Tg resin is less than 80000, sufficient mechanical strength of the shaped article may not be obtained, and when that is more than 800000, sufficient melt dispersibility cannot be obtained and appearance deterioration of the shaped article may be caused.

Moreover, in the acrylic thermoplastic resin composition, a refractive index difference Δd between a refractive index $d_A$ of the first acrylic resin and a refractive index $d_B$ of the second acrylic resin is preferably less than 0.04, more preferably less than 0.03, and further preferably less than 0.02. By the combination satisfying such a refractive index difference Δd, a compatibilizing uniform phase which further excels in transparency is formed in the acrylic thermoplastic resin composition.

In the acrylic thermoplastic resin composition, the amount of the first structural unit larger than other structural units is preferably contained in order to maintain excellent transparency, weather resistance and mechanical characteristics of a methacrylic resin. Thus, the content of the first structural unit is, based on a total amount of the first acrylic resin and the second acrylic resin, 50 to 95 mass %. It is preferably 60 to 95 mass %, more preferably 65 to 90 mass %, further preferably 70 to 90 mass %, and most preferably 70 to 85 mass %. When the content of the first structural unit is within this range, the acrylic thermoplastic resin composition further excels in transparency, weather resistance and mechanical characteristics.

Moreover, in the acrylic thermoplastic resin composition, the total content of the second structural unit and the third structural unit is, based on a total amount of the first acrylic resin and the second acrylic resin, 5 to 50 mass %. It is preferably 5 to 40 mass %, more preferably 10 to 35 mass %, further preferably 10 to 30 mass %, and most preferably 15 to 30 mass %. When the total content of the second structural unit and the third structural unit is within this range, in the acrylic thermoplastic resin composition, heat resistance is further improved and a preferable improvement effect of weather resistance and optical characteristics (birefringence and photoelastic coefficient) can be obtained.

Moreover, in the acrylic thermoplastic resin composition, the content of the second structural unit is, based on a total amount of the first acrylic resin and the second acrylic resin, preferably 0.1 to 49.9 mass %, more preferably 0.1 to 20 mass %, and further preferably 0.1 to 18 mass %. It is most preferably 0.1 to 16 mass %. When the content of the second structural unit is within this range, the acrylic thermoplastic resin composition further excels in transparency, weather resistance and mechanical characteristics.

Moreover, in the acrylic thermoplastic resin composition, the content of the third structural unit is, based on a total amount of the first acrylic resin and the second acrylic resin, preferably 0.1 to 49.9 mass %, more preferably 0.1 to 40 mass %, and further preferably 0.1 to 35 mass %. It is most preferably 0.1 to 30 mass %. When the content of the third structural unit is within this range, the acrylic thermoplastic resin composition further excels in transparency, weather resistance and mechanical characteristics.

Furthermore, when the acrylic thermoplastic resin composition contains the fourth structural unit and/or the fifth structural unit, hygroscopicity tends to be improved. The total content of the fourth structural unit and the fifth structural unit in the acrylic thermoplastic resin composition is, based on a total amount of the first acrylic resin and the second acrylic resin, preferably 0 to 20 mass %, more preferably 0 to 15 mass %, and further preferably 0 to 10 mass %.

As one example of the contents of the respective structural units, for example, based on a total amount of the first acrylic resin and the second acrylic resin, preferably, the content of the first structural unit is 50 to 95 mass %, the content of the second structural unit is 0.1 to 49.9 mass %, the content of the third structural unit is 0.1 to 49.9 mass %, and the total content of the fourth structural unit and the fifth structural unit is 0 to 20 mass %.

Moreover, based on a total amount of the first acrylic resin and the second acrylic resin, more preferably, the content of the first structural unit is 50 to 95 mass %, the content of the second structural unit is 0.1 to 20 mass %, the content of the third structural unit is 0.1 to 49.9 mass %, and the total content of the fourth structural unit and the fifth structural unit is 0 to 20 mass %.

It is to be noted that the contents of the respective structural units can be calculated by analyzing each of the first acrylic resin and the second acrylic resin with an NMR method and based on the blending amount of the respective acrylic resins. In addition, the contents of the respective structural units can be determined by analyzing the acrylic thermoplastic resin composition with an NMR method.

(Preparation of Acrylic Thermoplastic Resin Composition)

The acrylic thermoplastic resin composition according to the present embodiment contains the first acrylic resin and the second acrylic resin, and is preferably a resin composition in which the first acrylic resin and the second acrylic resin are compatibilized with each other.

Examples of a method of mixing (blending) the first acrylic resin and the second acrylic resin include a method of blending by general melt kneading. The kneading temperature is varied depending on the blending ratio of the resins or the copolymer composition of the copolymer, and it is performed at 200 to 280° C., preferably at 200 to 270° C., and more preferably at 200 to 260° C. The melt kneading at lower temperature can further suppress thermal decomposition or the degree of coloration.

Moreover, there are a method of obtaining the acrylic thermoplastic resin composition by liquid-mixing the polymerization solution of the first acrylic resin (A) and the polymerization solution of the second acrylic resin obtained during the above-described polymerization reaction, and thereafter performing precipitation treatment by the devolatilization step treatment or poor solvent addition, and a method of obtaining the acrylic thermoplastic resin composition by dissolving the first acrylic resin and the second acrylic resin with a solvent capable of dissolving both of them simultaneously (for example, acetone, methyl ethyl ketone and tetrahydrofuran), and thereafter performing precipitation treatment of the obtained solution by the devolatilization step treatment or poor solvent addition.

The acrylic thermoplastic resin composition according to the present embodiment may contain various additives within the range not significantly impairing the effects of the present invention. The kind of the additives is not particularly limited as long as they are generally used in blending of resins or rubber polymers.

Examples of the additives include inorganic fillers; pigments such as iron oxides; lubricants or mold release agents such as stearic acid, behenic acid, zinc stearate, calcium stearate, magnesium stearate and ethylenebisstearamide; softeners or plasticizers such as paraffinic process oil, naphthenic process oil, aromatic process oil, paraffin, organic polysiloxane and mineral oil; hindered phenol antioxidants, antioxidants such as phosphorus heat stabilizers, hindered amine light stabilizers, benzotriazole ultraviolet absorbers, flame retardants, antistatic agents; reinforcing agents such as organic fibers, glass fibers, carbon fibers and metal whiskers; coloring agents; other additives; and mixtures thereof. The content ratio of the additives is preferably 0 to 5 mass %, more preferably 0 to 2 mass %, and further preferably 0 to 1 mass %.

The acrylic thermoplastic resin composition can contain, within the range not impairing the object of the present invention, for example, at least one of thermoplastic resins including polyolefin resins such as polyethylene and polypropylene; styrene resins such as polystyrene, styrene/acrylonitrile copolymers, styrene/maleic acid anhydride copolymers and styrene/methacrylic acid copolymers; polymethacrylic acid ester resins; polyamide; polyphenylene sulfide resins; polyether ether ketone resins; polyester resins; polysulfone; polyphenylene oxide; polyimide; polyetherimide; polyacetal; cyclic olefin resins; norbornene resins; and cellulose resins such as triacetylcellulose, and thermosetting resins including phenol resins; melamine resins; silicone resins; and epoxy resins.

(Optical Characteristics of Acrylic Thermoplastic Resin Composition)

(i) Absolute Value of Photoelastic Coefficient C

The acrylic thermoplastic resin composition according to the present embodiment preferably has the absolute value of a photoelastic coefficient C of $3.0 \times 10^{-12}$ $Pa^{-1}$ or less, more preferably $2.0 \times 10^{-12}$ $Pa^{-1}$ or less, and further preferably $1.0 \times 10^{-12}$ $Pa^{-1}$ or less.

The photoelastic coefficient is described in various literature (for example, refer to Chemical Review, No. 39, 1998 (published by Japan Scientific Societies Press)), and is defined by the following equations (i-a) and (i-b). It is understood that as the value of the photoelastic coefficient $C_R$ is closer to zero, a birefringence change by external force is smaller.

$$C_R = |\Delta n|/\sigma_R \tag{i-1}$$

$$|\Delta| = nx - ny \tag{i-2}$$

In the equations, $C_R$ represents a photoelastic coefficient, $\sigma_R$ represents extensional stress, $|\Delta n|$ represents an absolute value of birefringence, nx represents a refractive index in the extension direction, and ny represents an in-plane refractive index in the direction perpendicular to the extension direction.

The photoelastic coefficient of the acrylic thermoplastic resin composition according to the present embodiment is sufficiently small compared with existing resins (for example, PMMA, PC, triacetylcellulose resins and cyclic olefin resins). Thus, (photoelastic) birefringence due to external force does not occur, thereby resulting in less birefringence change. Moreover, (photoelastic) birefringence due to remaining stress in shaping is difficult to occur, thereby resulting in small birefringence distribution in the shaped article.

(ii) Relation Between Birefringence Δn and Stretch Ratio S

When characteristics of the acrylic thermoplastic resin composition according to the present embodiment are evaluated as a uniaxially-stretched film, in a linear relational equation (ii-a) by least squares approximation between birefringence Δn (S) and a stretch ratio S, a value of a slope K preferably satisfies the following equation (ii-b).

$$\Delta n(S) = K \times S + C \tag{ii-a}$$

$$|K| \le 0.30 \times 10^{-5} \tag{ii-b}$$

In the equation, Δn(S) represents a birefringence, and S represents a stretch ratio. It is to be noted that birefringence Δn(S) is a value obtained by converting the value measured as a film (the value obtained from the above equation (i-2)) in terms of a thickness of 100 μm. C in the equation (ii-a) is a constant number and represents birefringence when not being stretched.

The absolute value of the slope K (|K|) is more preferably $0.15 \times 10^{-5}$ or less, and further preferably $0.10 \times 10^{-5}$ or less.

The value of K is a value obtained by measuring a glass-transition temperature (Tg) of the acrylic thermoplastic resin composition by DSC measurement and performing uniaxial stretching at a stretching temperature of (Tg+20)° C. and a stretching speed of 500 mm/min.

In general, it is known that a slower stretching speed results in a smaller increment of birefringence. It is to be noted that the value of K can be calculated, for example, by measuring values of birefringence (Δn(S)) exhibited in the uniaxially-stretched films obtained by being stretched at stretch ratios (S) of 100%, 200%, and 300%, respectively, and plotting these values against the stretch ratios to perform least squares approximation. The stretch ratio (S) is a value represented by the following equation, in which an inter-chuck distance before stretching is defined as $L_0$ and an inter-chuck distance after stretching is defined as $L_1$.

$$S = \frac{L_1 - L_0}{L_0} \times 100 (\%) \tag{Expression 1}$$

A film-like or sheet-like shaped article may be subjected to a stretching process for the purpose of increasing mechanical strength. In the above-described relational equation, the value of the slope K represents the magnitude of change in birefringence (Δn(S)) with respect to the stretch ratio (S), and a larger K means a larger amount of change of birefringence with respect to stretching and a smaller K means a smaller amount of change of birefringence with respect to stretching.

The value of the slope K of the acrylic thermoplastic resin composition according to the present embodiment is sufficiently small compared with existing resins (for example, PMMA, PC, triacetylcellulose resins and cyclic olefin resins). Thus, the acrylic thermoplastic resin composition has a feature in that birefringence is difficult to increase after the stretching processing, while birefringence of the existing resins is increased due to the stretching orientation in the stretching processing.

(iii) Retardation Re in in-Plane Direction

When characteristics of the acrylic thermoplastic resin composition according to the present embodiment are evaluated as a film-like or sheet-like shaped article, the absolute value of the retardation Re in the in-plane direction is preferably 30 nm or less. It is to be noted that the retardation Re is a value obtained by converting the value measured as a film (or sheet) in terms of a thickness of 100 μm.

The absolute value of the retardation Re is more preferably 20 nm or less, further preferably 15 nm or less, and particularly preferably 11 nm or less.

In general, the absolute value of the retardation Re is an index representing the magnitude of birefringence. The acrylic thermoplastic resin composition according to the present embodiment has sufficiently a small birefringence compared with existing resins (for example, PMMA, PC, triacetylcellulose resins and cyclic olefin resins), and thus, is suitable for applications that require low birefringence or zero birefringence as optical materials.

In contrast, the absolute value of the retardation Re in the in-plane direction of more than 30 nm means high refractive index anisotropy, which may not be used for applications that require low birefringence or zero birefringence as optical materials. In addition, in the case where the stretching processing is performed to improve mechanical strength of optical materials (for example, film, sheet or the like), if the absolute value of the retardation in the in-plane direction after the stretching processing is more than 30 nm, the obtained optical materials are not low birefringence or zero birefringence materials.

(iv) Retardation Rth in Thickness Direction

When characteristics of the acrylic thermoplastic resin composition according to the present embodiment are evaluated as a film-like or sheet-like shaped article, the absolute value of the retardation Rth in the thickness direction is preferably 30 nm or less. It is to be noted that the retardation Rth is a value obtained by converting the value measured as a film (or sheet) in terms of a thickness of 100 µm.

The absolute value of the retardation Rth is more preferably 20 nm or less, further preferably 15 nm or less, and particularly preferably 11 nm or less.

The retardation Rth in the thickness direction is an index correlated with viewing angle characteristics of a display device in which an optical material, especially an optical film, is incorporated. Specifically, a smaller absolute value of the retardation Rth in the thickness direction results in more favorable viewing angle characteristics, and smaller display color change and contrast reduction depending on the angle at which the display device is viewed.

The acrylic thermoplastic resin composition according to the present embodiment has a feature in that the absolute value of the retardation Rth in the thickness direction as the optical film is extremely small compared with existing resins (for example, PMMA, PC, triacetylcellulose resins and cyclic olefin resins).

(v) Glass-Transition Temperature Tg

From the viewpoint of dimensional stability in the usage environment, the shaped article of the acrylic thermoplastic resin composition preferably has high heat resistance. The glass-transition temperature Tg of the acrylic thermoplastic resin composition is preferably 120° C. or more, more preferably 130° C. or more, and further preferably 135° C. or more.

(vi) Total Light Transmittance

When characteristics of the acrylic thermoplastic resin composition according to the present embodiment are evaluated as a film-like or sheet-like shaped article, the total light transmittance is preferably 85% or more, more preferably 88% or more, and further preferably 90% or more. It is to be noted that the total light transmittance is a value obtained by conversion in terms of a thickness of 100 µm.

(vii) Refractive Index

The refractive index $d_{blend}$ of the acrylic thermoplastic resin composition according to the present embodiment is preferably within the range of 1.48 to 1.53. In particular, in the case of using the shaped article to be obtained as an optical film, the refractive index $d_{blend}$ is more preferably within the range of 1.48 to 1.51. When the refractive index $d_{blend}$ is within this range, the acrylic thermoplastic resin composition can be suitably used as a polarizing plate material used for liquid crystal display televisions. It is to be noted that the refractive indexes of conventional polarizing plate materials, for example, the refractive index of polyvinyl alcohol resins is 1.49 to 1.53, the refractive index of triacetylcellulose resins is 1.49, and the refractive index of cyclic polyolefin resins is 1.53.

As described above, the acrylic thermoplastic resin composition according to the present embodiment is characterized by having a sufficiently small photoelastic coefficient C (approximately zero), and, when being shaped into an optical film, having small absolute values (approximately zero) of both the retardation Re in the in-plane direction and the retardation Rth in the thickness direction as an optical film with or without the stretching process, and optically perfect isotropy which cannot be achieved by conventionally-known resins can be achieved. Furthermore, the acrylic thermoplastic resin composition according to the present embodiment can achieve high heat resistance at the same time.

Therefore, the optical film formed by shaping the acrylic thermoplastic resin composition according to the present embodiment is mainly suitable for applications not requiring birefringence, for example, polarizing plate protection films or the like. Furthermore, the optical film is suitably used for applications such as retardation films, retardation plates, transparent plastic substrates and lenses.

Moreover, the acrylic thermoplastic resin composition according to the present embodiment can be suitably used as optical materials, for example, as shaped articles such as optical films, display substrates, lenses, pickup lenses, and transparent plastic substrates used for touch panels or solar cells. In addition, the acrylic thermoplastic resin composition can be used for waveguides, lenses, lens arrays, optical fibers, covering materials of optical fibers, LED lenses, lens covers, and the like in the fields of an optical communication system, an optical switching system, an optical measurement system, and the like.

[Shaped Article Formed of Acrylic Thermoplastic Resin Composition]

The acrylic thermoplastic resin composition according to the present embodiment can be shaped into, for example, sheet-like, film-like, strand-like or pipe-like extrusion-shaped articles, disc-like, cube-like or plate-like injection-shaped articles, and press-shaped articles. These shaped articles have features corresponding to the above-described characteristics of the acrylic thermoplastic resin composition according to the present embodiment.

Among the above-described shaped articles, the thickness of the film-like or sheet-like shaped article is preferably 1 to 10000 µm, more preferably 1 to 5000 µm, and further preferably 1 to 3000 µm.

As methods of forming the acrylic thermoplastic resin composition according to the present embodiment into the shaped article, for example, in the case of the shaping processing into the film-like or sheet-like shaped article, methods such as extrusion, solution casting, and the like can be used.

Specifically, for example, in extrusion, the acrylic thermoplastic resin composition is melt and can be shaped into a sheet or a film using an extruder equipped with a T die, a round die or the like. In this case, a shaped article can be obtained by melt kneading various additives, thermoplastic resins other than the acrylic thermoplastic resin composition according to the present embodiment, with the acrylic thermoplastic resin composition according to the present embodiment.

In solution casting, for example, the acrylic thermoplastic resin composition is dissolved in a solvent such as chloroform and methylene dichloride to produce a polymer solution, and then, the polymer solution can be shaped into a sheet or a film by cast and drying-solidification.

The stretching of the sheet-like or film-like shaped article can be continuously performed following the extrusion and the cast shaping. For example, the unstretched film or sheet is stretched longitudinally and uniaxially in the machine flow direction or transversely and uniaxially in the direction perpendicular to the machine flow direction, or is stretched by a successive biaxial stretching method using roll stretching and tenter stretching, a simultaneous biaxial stretching method using tenter stretching, a biaxial stretching method using tubular stretching, and the like so that a biaxially-stretched film can be formed.

The stretching can improve strength of the shaped article. The stretch ratio is 0.1% or more and 300% or less at least in one direction, preferably 0.2% or more and 290% or less, and more preferably 0.3% or more and 280% or less. By the stretching in this range, a shaped article which further excels in optical characteristics such as strength, transparency, and birefringence can be obtained.

The shaped article after the stretching can be subjected to heat treatment (annealing) for the purpose of stabilizing its mechanical characteristics and optical characteristics. The conditions of the heat treatment may be appropriately selected similar to the conditions of heat treatment for a conventionally-known sheet or film, and are not particularly limited.

The shaped article according to the present embodiment, for example, the sheet-like or film-like shaped article can be subjected to surface functionalization treatment such as antireflection treatment, transparent conductive treatment, electromagnetic shielding treatment, and gas barrier treatment.

Moreover, the injection-shaped article can be obtained by using a conventionally-known method within the ranges: an injection shaping temperature of 200 to 260° C., a die temperature of 50 to 100° C., an injection pressure of 5 to 20 MPa, and a holding pressure of 1 to 10 MPa.

The shaped article according to the present embodiment can be suitably used, for example, for polarizing plate protection films used for liquid crystal displays, plasma displays, organic EL displays, field emission displays and displays such as rear-projection televisions, retardation plates such as quarter-wavelength plates and half-wavelength plates, liquid crystal optical compensation films such as viewing angle control films, display front plates, display substrates, lenses, and further, transparent substrates used for solar cells and transparent conductive substrates such as touch panels.

In addition, the shaped article according to the present embodiment can be used for waveguides, lenses, lens arrays, optical fibers, covering materials of optical fibers, LED lenses, lens covers and the like in the fields of an optical communication system, an optical switching system, and an optical measurement system.

Heretofore, preferred embodiments of the present invention have been described, but the present invention is not limited to the above-described embodiments.

EXAMPLES

Hereinafter, the present invention will be described more specifically with reference to Examples, but the present invention is not limited to Examples. Firstly, measurement methods of respective measurement values are described below.

(a) Analysis of First Acrylic Resin and Second Acrylic Resin (a-1) Analysis of Structural Unit The first structural unit, the second structural unit, the third structural unit, the fourth structural unit and the fifth structural unit were identified by $^1$H-NMR measurement and $^{13}$C-NMR measurement, and their abundance was calculated. The measurement conditions of the $^1$H-NMR measurement and the $^{13}$C-NMR measurement are as follows.
Measuring Instrument: DPX-400 manufactured by Bruker Corporation
Measurement Solvent: CDCl$_3$ or d$^6$-DMSO
Measurement Temperature: 40° C.

(a-2) Measurement of Glass-Transition Temperature Tg

The glass-transition temperature (Tg) was measured in accordance with JIS-K-7121 with α-alumina as a reference under a nitrogen gas atmosphere using a differential scanning calorimeter (Diamond DSC manufactured by PerkinElmer Japan Co., Ltd.) and was calculated by a midpoint method from a DSC curve that was obtained by increasing the temperature of approximately 10 mg of a sample from ordinary temperature to 200° C. at a rate of temperature increase of 10° C./min.

(a-3) Measurement of Molecular Weight

The weight average molecular weight and the number average molecular weight were measured using a gel permeation chromatograph (HLC-8220 manufactured by Tosoh Corporation) at the preset temperature of 40° C. with tetrahydrofuran as a solvent and was determined in terms of commercially available standard PMMA.

(a-4) Measurement of Refractive Index

The refractive index $d_A$ of the first acrylic resin and the refractive index $d_B$ of the second acrylic resin were measured using a refractive index measuring device (MODEL 2010 PRISM COUPLER manufactured by Metricon Corporation) and a press film obtained by the method described below in a room temperature environment at a measurement wavelength of 633 nm.

(b) Evaluation of Acrylic Thermoplastic Resin Composition (b-1) Weather Resistance The weather resistance was evaluated by measuring a yellow index using a spectrophotometer (SD-5000 manufactured by Nippon Denshoku Industries Co., Ltd.) after exposure in an environment at a temperature of 63° C. and a humidity of 60% for approximately 150 hours using EYE Super UV Tester (SUV-W151 manufactured by Iwasaki Electric Co., Ltd.; metal halide lamp).

(b-2) Measurement of Melt Mass Flow Rate (g/10 Min)

The measurement was performed in accordance with RS-K-7210. Specifically, the melt mass flow rate was determined by making the acrylic thermoplastic resin composition dried in advance for 2 hours at 120° C. be discharged (orifice φ 2.095 mm×L 8 mm) for 10 minutes using Melt Indexer manufactured by Toyo Seiki Seisaku-sho, Ltd. at a temperature of 230° C. and a load of 5 kg and measuring the weight of the discharged strand-like resin.

(b-3) Evaluation of Optical Characteristics

A press film and a stretched film were manufactured from the acrylic thermoplastic resin composition by the following method, and optical characteristics of the stretched film were evaluated by the following method.

[Manufacture of Press Film]

A press film was shaped by preheating at 260° C. for 25 minutes under atmospheric pressure, thereafter compressing at 260° C. and approximately 10 MPa for 5 minutes under vacuum (approximately 10 kPa) using a vacuum compression shaping machine (SFV-30 model manufactured by SHINTO Metal Industries Corporation).

[Manufacture of Stretched Film]

The stretched film was shaped by uniaxial free stretching of the above-described press film at a stretching temperature of (Tg+20)° C. and a stretching speed of (500 mm/min) using a 5 t tensile tester manufactured by Instron Corporation. As the stretched film, the stretched films having stretch ratios of 100%, 200% and 300%, respectively, were manufactured, and were used for the following characteristics evaluation.

(b-3-1) Measurement of Birefringence

The measurement was performed by a rotating analyzer method using RETS-100 manufactured by Otsuka Electronics Co., Ltd. The birefringence value is a value of light having a wavelength of 550 nm. The birefringence (Δn) was calculated according to the following equation. As a measurement value, the obtained value was converted in terms of a film thickness of 100 μm. In addition, the absolute value (|Δn|) of the birefringence (Δn) was determined as follows.

$$\Delta n = nx - ny$$

$$|\Delta n| = |nx - ny|$$

(In the equations, Δn represents a birefringence, nx represents a refractive index in the extension direction, and ny represents an in-plane refractive index in the direction perpendicular to the extension direction.)

(b-3-2) Measurement of Retardation Re in in-Plane Direction

The measurement was performed in the wavelength range of 400 to 800 nm by a rotating analyzer method using RETS-100 manufactured by Otsuka Electronics Co., Ltd. As a measurement value, the obtained value was converted in terms of a film thickness of 100 μm. The absolute value (|Δn|) of the birefringence and the retardation (Re) are in the following relation. In addition, the absolute value (|Δn|) of the birefringence is the value represented below.

$$Re = |\Delta n| \times d$$

(In the equation, |Δn| represents the absolute value of birefringence, Re represents retardation, and d represents a sample thickness.)

$$|\Delta n| = |nx - ny|$$

(In the equation, nx represents a refractive index in the extension direction, and ny represents an in-plane refractive index perpendicular to the extension direction.)

(b-3-3) Measurement of Retardation Rth in Thickness Direction

The retardation at a wavelength of 589 nm was measured using a retardation measuring device (KOBRA-21ADH) manufactured by Oji Scientific Instruments, and, as a measurement value, the obtained value was converted in terms of a film thickness of 100 μm. The absolute value (|Δn|) of the birefringence and the retardation (Rth) are in the following relation. In addition, the absolute value (|Δn|) of the birefringence is the value represented below.

$$Rth = |\Delta n| \times d$$

(In the equation, |Δn| represents the absolute value of birefringence, Rth represents retardation, and d represents a sample thickness.)

$$|\Delta n| = |(nx + ny)/2 - nz|$$

(In the equation, nx represents a refractive index in the extension direction, ny represents an in-plane refractive index perpendicular to the extension direction, and nz represents an out-of-plane refractive index in the thickness direction perpendicular to the extension direction.)

It is to be noted that, in an ideal film having perfect isotropy in the three-dimensional directions, both of the in-plane retardation (Re) and the retardation (Rth) in the thickness direction are zero.

(b-3-4) Measurement of Photoelastic Coefficient

A birefringence measuring device described in detail in Polymer Engineering and Science 1999, 39, 2349-2357 was used. A film stretching device (manufactured by Imoto Machinery Co., Ltd.) was placed on a laser light path, and a birefringence was measured while applying extensional stress at 23° C. The measurement was performed at a strain rate of 50%/min (inter-chuck: 50 mm, chuck transfer rate: 5 mm/min) during extension, and a width of a test piece of 6 mm. From the relation of the absolute value (|Δn|) of the birefringence and the extensional stress ($\sigma_R$), the photoelastic coefficient ($C_R$) was calculated by determining a slope of the line by least squares approximation. Data obtained with the extensional stress of 2.5 MPa ≤ $\sigma_R$ ≤ 10 MPa was used in the calculation.

$$C_R |\Delta n| / \sigma_R$$

$$|\Delta| = |nx - ny|$$

(In the equation, $C_R$ represents a photoelastic coefficient, $\sigma_R$ represents extensional stress, |Δn| represents the absolute value of birefringence, nx represents a refractive index in the extension direction, and ny represents an in-plane refractive index perpendicular to the extension direction.)

(b-3-5) Measurement of Refractive Index

The refractive index $d_{blend}$ of the acrylic thermoplastic resin composition was measured using a refractive index measuring device (MODEL 2010 PRISM COUPLER manufactured by Metricon Corporation) and the press film obtained by the above-described method in a room temperature environment at a measurement wavelength of 633 nm.

(b-4) Measurement of Glass-Transition Temperature Tg

The glass-transition temperature (Tg) was measured in accordance with JIS-K-7121 with α-alumina as a reference under a nitrogen gas atmosphere using a differential scanning calorimeter (Diamond DSC manufactured by PerkinElmer Japan Co., Ltd.) and was calculated by a midpoint method from a DSC curve that was obtained by increasing the temperature of approximately 10 mg of a sample from ordinary temperature to 200° C. at a rate of temperature increase of 10° C./min.

Synthesis Example 1: Synthesis of First Acrylic Resin (A-1)

A glass reactor (capacity 1.0 L) equipped with a stirrer, a temperature sensor, a cooling tube, a nitrogen gas inlet nozzle, a raw material solution inlet nozzle and an initiator solution inlet nozzle was used. The pressure of the polymerization reactor was controlled to be slightly pressurized and the reaction temperature was controlled to 100° C. with an oil bath.

A raw material solution was prepared by mixing 190 g of methyl methacrylate, 10 g of N-phenylmaleimide, and 200 g of methyl isobutyl ketone, followed by replacement with nitrogen gas. An initiator solution was prepared by dissolving 0.32 g of PERHEXA C (manufactured by NOF Corporation; concentration 75 mass %) in 1.00 g of methyl isobutyl ketone, followed by replacement with nitrogen gas.

The raw material solution was introduced into the glass reactor from the raw material solution inlet nozzle by pumping. Moreover, the initiator solution was introduced from the initiator solution inlet nozzle using a syringe to start the polymerization reaction. Three hours after the start of the reaction was set as the reaction end point, and a polymer solution was collected. The obtained polymer solution and methanol as a poor solvent were simultaneously supplied to a homogenizer for emulsion dispersion extraction. The separated and precipitated polymer was collected and dried under vacuum at 130° C. for 2 hours to obtain the intended first acrylic resin (A-1).

With respect to the obtained first acrylic resin (A-1), the analysis of the structural unit, the measurement of the glass-transition temperature and the measurement of the molecular weight were performed by the above-described methods. The results are as follows. It is to be noted that, hereinafter, the structural unit derived from methyl methacrylate is referred to as "MMA," and the structural unit derived from N-phenylmaleimide is referred to as "N-PheMI" in some cases.

Structural Unit: MMA/N-PheMI=97/3 (mass %)
Molecular Weight: $Mw=20.4\times10^4$, $Mw/Mn=1.71$
Tg: 124° C.

Synthesis Example 2: Synthesis of First Acrylic Resin (A-2)

The first acrylic resin (A-2) was obtained by performing the same operation as Synthesis Example 1, except that the amount of raw material monomers used was changed to 160 g of methyl methacrylate and 40 g of N-phenylmaleimide. With respect to the obtained first acrylic resin (A-2), the analysis of the structural unit, the measurement of the glass-transition temperature, and the measurement of the molecular weight were performed by the above-described methods. The results are as follows.

Structural Unit: MMA/N-PheMI=81/19 (mass %)
Molecular Weight: $Mw=19.4\times10^4$, $Mw/Mn=1.81$
Tg: 141° C.

Synthesis Example 3: Synthesis of First Acrylic Resin (A-3)

The first acrylic resin (A-3) was obtained by performing the same operation as Synthesis Example 1, except that the amount of raw material monomers used was changed to 135 g of methyl methacrylate and 65 g of N-phenylmaleimide. With respect to the obtained first acrylic resin (A-3), the analysis of the structural unit, the measurement of the glass-transition temperature, and the measurement of the molecular weight were performed by the above-described methods. The results are as follows.

Structural Unit: MMA/N-PheMI=65/35 (mass %)
Molecular Weight: $Mw=17.6\times10^4$, $Mw/Mn=2.08$
Tg: 156° C.

Synthesis Example 4: Synthesis of First Acrylic Resin (A-4)

The first acrylic resin (A-4) was obtained by performing the same operation as Synthesis Example 1, except that the amount of raw material monomers used was changed to 100 g of methyl methacrylate and 100 g of N-phenylmaleimide. With respect to the obtained first acrylic resin (A-4), the analysis of the structural unit, the measurement of the glass-transition temperature, and the measurement of the molecular weight were performed by the above-described methods. The results are as follows.

Structural Unit: MMA/N-PheMI=50/50 (mass %)
Molecular Weight: $Mw=15.4\times10^4$, $Mw/Mn=2.19$
Tg: 176° C.

Synthesis Example 5: Synthesis of First Acrylic Resin (A-5)

The first acrylic resin (A-5) was obtained by performing the same operation as Synthesis Example 1, except that the amount of raw material monomers used was changed to 135 g of methyl methacrylate and 65 g of N-benzylmaleimide. With respect to the obtained first acrylic resin (A-5), the analysis of the structural unit, the measurement of the glass-transition temperature, and the measurement of the molecular weight were performed by the above-described methods. The results are as follows. It is to be noted that, hereinafter, the structural unit derived from N-benzylmaleimide is referred to as "N-BzMI" in some cases.

Structural Unit: MMA/N-BzMI=65/35 (mass %)
Molecular Weight: $Mw=18.3\times10^4$, $Mw/Mn=2.29$
Tg: 140° C.

Synthesis Example 6: Synthesis of First Acrylic Resin (A-6)

The first acrylic resin (A-6) was obtained by performing the same operation as Synthesis Example 1, except that the amount of raw material monomers used was changed to 128 g of methyl methacrylate and 32 g of N-phenylmaleimide, and further 40 g of styrene (St) was made to coexist in the raw material solution. With respect to the obtained first acrylic resin (A-6), the analysis of the structural unit, the measurement of the glass-transition temperature, and the measurement of the molecular weight were performed by the above-described methods. The results are as follows. It is to be noted that, hereinafter, the structural unit derived from styrene is referred to as "St" in some cases.

Structural Unit: MMA/N-PheMI/St=64/16/20 (mass %)
Molecular Weight: $Mw=17.2\times10^4$, $Mw/Mn=2.23$
Tg: 131° C.

Synthesis Example 7: Synthesis of Second Acrylic Resin (B-1)

The second acrylic resin (B-1) was obtained by performing the same operation as Synthesis Example 1, except that raw material monomers was changed to 180 g of methyl methacrylate and 20 g of N-cyclohexylmaleimide. With respect to the obtained second acrylic resin (B-1), the analysis of the structural unit, the measurement of the glass-transition temperature, and the measurement of the molecular weight were performed by the above-described methods. The results are as follows. It is to be noted that, hereinafter, the structural unit derived from N-cyclohexylmaleimide is referred to as "N-CyMI" in some cases.

Structural Unit: MMA/N-CyMI=91/9 (mass %)
Molecular Weight: $Mw=21.0\times10^4$, $Mw/Mn=1.75$
Tg: 129° C.

Synthesis Example 8: Synthesis of Second Acrylic Resin (B-2)

The second acrylic resin (B-2) was obtained by performing the same operation as Synthesis Example 1, except that the raw material monomers was changed to 160 g of methyl methacrylate and 40 g of N-cyclohexylmaleimide. With respect to the obtained second acrylic resin (B-2), the analysis of the structural unit, the measurement of the glass-transition temperature, and the measurement of the molecular weight were performed by the above-described methods. The results are as follows.

Structural Unit: MMA/N-CyMI=78/22 (mass %)
Molecular Weight: $Mw=21.1\times10^4$, $Mw/Mn=1.73$
Tg: 135° C.

Synthesis Example 9: Synthesis of Second Acrylic Resin (B-3)

The second acrylic resin (B-3) was obtained by performing the same operation as Synthesis Example 1, except that the raw material monomers was changed to 135 g of methyl methacrylate and 35 g of N-cyclohexylmaleimide. With respect to the obtained second acrylic resin (B-3), the analysis of the structural unit, the measurement of the glass-transition temperature, and the measurement of the molecular weight were performed by the above-described methods. The results are as follows.
Structural Unit: MMA/N-CyMI=65/35 (mass %)
Molecular Weight: Mw=19.4×10$^4$, Mw/Mn=1.93
Tg: 148° C.

Synthesis Example 10: Synthesis of Second Acrylic Resin (B-4)

The second acrylic resin (B-4) was obtained by performing the same operation as Synthesis Example 1, except that the raw material monomers was changed to 100 g of methyl methacrylate and 100 g of N-cyclohexylmaleimide. With respect to the obtained second acrylic resin (B-4), the analysis of the structural unit, the measurement of the glass-transition temperature, and the measurement of the molecular weight were performed by the above-described methods. The results are as follows.
Structural Unit: MMA/N-CyMI=52/48 (mass %)
Molecular Weight: Mw=19.1×10$^4$, Mw/Mn=2.06
Tg: 163° C.

Synthesis Example 11: Synthesis of Second Acrylic Resin (B-5)

The second acrylic resin (B-5) was obtained by performing the same operation as Synthesis Example 1, except that the raw material monomers was changed to 160 g of methyl methacrylate and 40 g of N-ethylmaleimide. With respect to the obtained second acrylic resin (B-5), the analysis of the structural unit, the measurement of the glass-transition temperature, and the measurement of the molecular weight were performed by the above-described methods. The results are as follows. It is to be noted that, hereinafter, the structural unit derived from N-ethylmaleimide is referred to as "N-EtMI" in some cases.
Structural Unit: MMA/N-EtMI=80/20 (mass %)
Molecular Weight: Mw=19.5×10$^4$, Mw/Mn=2.01
Tg: 134° C.

Synthesis Example 12: Synthesis of Second Acrylic Resin (B-6)

The second acrylic resin (B-6) was obtained by performing the same operation as Synthesis Example 1, except that the raw material monomers was changed to 135 g of methyl methacrylate and 65 g of N-isopropylmaleimide. With respect to the obtained second acrylic resin (B-6), the analysis of the structural unit, the measurement of the glass-transition temperature, and the measurement of the molecular weight were performed by the above-described methods. The results are as follows. It is to be noted that, hereinafter, the structural unit derived from N-isopropylmaleimide is referred to as "N-iPrMI" in some cases.
Structural Unit: MMA/N-iPrMI=65/35 (mass %)
Molecular Weight: Mw=20.5×10$^4$, Mw/Mn=2.36
Tg: 132° C.

Synthesis Example 13: Synthesis of Second Acrylic Resin (B-7)

The second acrylic resin (B-7) was obtained by performing the same operation as Synthesis Example 1, except that the raw material monomers was changed to 144 g of methyl methacrylate, 16 g of N-cyclohexylmaleimide and 40 g of styrene. With respect to the obtained second acrylic resin (B-7), the analysis of the structural unit, the measurement of the glass-transition temperature, and the measurement of the molecular weight were performed by the above-described methods. The results are as follows.
Structural Unit: MMA/N-CyMI/St=72/8/20 (mass %)
Molecular Weight: Mw=19.2×10$^4$, Mw/Mn=2.03
Tg: 123° C.

Reference Synthesis Example 1: Synthesis of Methyl Methacrylate Polymer (Acrylic Resin (C-1)

The acrylic resin (C-1) was obtained by performing the same operation as Synthesis Example 1, except that 960 g of methyl methacrylate was used as the raw material monomer and the amount of methyl isobutyl ketone used was changed to 240 g. With respect to the obtained acrylic resin (C-1), the analysis of the structural unit, the measurement of the glass-transition temperature, and the measurement of the molecular weight were performed by the above-described methods. The results are as follows.
Structural Unit: MMA=100 (mass %)
Molecular Weight: Mw=10×10$^4$, Mw/Mn=1.89
Tg: 121° C.

The compositions (structural unit ratios) and heat resistance of the acrylic resins obtained as described above are shown in Table 1. Furthermore, each of the acrylic resins was shaped into the press film in accordance with the above-described method, the 100% stretched film was further shaped from the press film in accordance with the above-described method, and its optical characteristics were evaluated. The evaluation results are shown in Table 1. It is to be noted that, in Table, weather resistance is indicated using weather resistance (yellow index) of the acrylic resin (C-1) as a reference, and yellow index larger than the reference is denoted by "B" and yellow index smaller than the reference is denoted by "A." A smaller yellow index is preferable because of less yellow tinge.

TABLE 1

| | composition (mass %) | | | | Tg | C × 10$^{12}$ | optical characteristics | | | |
| | | | | | | | Re | Rth | refractive | weather |
| | MMA | PHeMI | CyMI | St | (° C.) | (Pa$^{-1}$) | (nm) | (nm) | index | resistance |
|---|---|---|---|---|---|---|---|---|---|---|
| A-1 | 97 | 3 | — | — | 124 | −3.2 | −32 | — | 1.493 | B |
| A-2 | 81 | 19 | | | 141 | +4.2 | −1 | | 1.508 | B |
| A-3 | 65 | 35 | — | — | 156 | +33.0 | +13 | — | 1.522 | B |
| A-4 | 50 | 50 | | | 176 | +15.2 | +16 | | 1.535 | B |
| A-5 | 65 | BzMl (35) | — | — | 140 | +26.9 | +150 | — | 1.520 | B |
| A-6 | 64 | 16 | — | 20 | 131 | +4.8 | −120 | — | — | B |

TABLE 1-continued

|     | composition (mass %) | | | | Tg | $C \times 10^{12}$ | Re | Rth | refractive | weather |
|     | MMA | PHeMI | CyMI | St | (° C.) | (Pa$^{-1}$) | (nm) | (nm) | index | resistance |
|---|---|---|---|---|---|---|---|---|---|---|
| B-1 | 91 | — | 9 | — | 129 | −4.3 | −19 | — | 1.492 | B |
| B-2 | 78 | — | 22 | — | 135 | −3.1 | −2 | — | 1.494 | B |
| B-3 | 65 | — | 35 | — | 148 | +0.4 | +31 | — | 1.499 | B |
| B-4 | 52 | — | 48 | — | 163 | +0.3 | +53 | — | 1.503 | B |
| B-5 | 80 | — | EtMI (20) | — | 134 | −3.3 | −4 | — | 1.493 | B |
| B-6 | 65 | — | iPrMI (35) | — | 132 | −1.5 | +31 | — | 1.497 | B |
| B-7 | 72 | — | 8 | 20 | 123 | −1.8 | −135 | — | x | B |
| C-1 | 100 | — | — | — | 121 | −4.7 | −36 | — | x | reference |

As shown in Table 1, when the acrylic resins obtained in Synthesis Examples 1 to 13 were independently formed into the shaped articles, the absolute value of the photoelastic coefficient C is more than $3.0 \times 10^{-12}$ Pa$^{-1}$, the absolute value of the in-plane retardation Re is more than 30 nm, or the like, and thus, it is found that a low birefringence is not sufficient.

Examples 1 to 15

The first acrylic resin and the second acrylic resin were respectively dissolved in tetrahydrofuran (THF), and stirred and mixed to be the blending ratio shown in Table 2 and Table 3. The obtained THF mixed solution was dropped into methanol as a poor solvent such that a methanol/THF ratio is within the range of 3 to 10 to obtain the intended acrylic thermoplastic resin composition.

The compositions (structural unit ratios) and heat resistance of the obtained acrylic thermoplastic resin compositions are shown in Table 2. Furthermore, each of the acrylic thermoplastic resin compositions was shaped into the press film in accordance with the above-described method. Then, the 100% stretched film was shaped from the press film in accordance with the above-described method, and its optical characteristics were evaluated. The evaluation results are shown in Table 2. It is to be noted that, FIG. 1 is a diagram showing a $^1$H-NMR spectrum of the acrylic thermoplastic resin composition obtained in Example 3.

Comparative Example 1

The acrylic resin (C-1) was shaped into the press film in accordance with the above-described method. Then, the 100% stretched film was shaped from the press film in accordance with the above-described method, and its optical characteristics were evaluated. The evaluation results are shown in Table 2 and Table 3.

It is to be noted that, in Table 2, "<10" means less than 10, and ">85" means more than 85. In addition, in Table 2, a low birefringence was evaluated as "A" in the case where the absolute value of the photoelastic coefficient C is $3.0 \times 10^{-12}$ Pa$^{-1}$ or less and the absolute value of the in-plane retardation Re is 11 nm or less, "B" in the case where the absolute value of the photoelastic coefficient C is $3.0 \times 10^{-12}$ Pa$^{-1}$ or less and the absolute value of the in-plane retardation Re is 30 nm or less, and "C" in the case where the absolute value of the photoelastic coefficient C is more than $3.0 \times 10^{-12}$ Pa$^{-1}$ or the absolute value of the in-plane retardation Re is more than 30 nm. Furthermore, compatibility was evaluated as "AA" in the case where the refractive index difference is less than 0.01, "A" in the case where that is less than 0.02, "B" in the case where that is less than 0.03, and "C" in the case where that is less than 0.04.

TABLE 2

| | | | Example | | | | | | | |
| | | | 1 | 2 | 3 | 4 | 5 | 6 | 7 | 8 |
|---|---|---|---|---|---|---|---|---|---|---|
| resin type | | A | A-1 | A-2 | A-2 | A-2 | A-2 | A-2 | A-3 | A-4 |
| | | B | B-3 | B-2 | B-2 | B-2 | B-2 | B-4 | B-1 | B-1 |
| blending ratio | | A | 75 | 1 | 45 | 50 | 80 | 90 | 55 | 20 |
| (mass %) | | B | 25 | 99 | 55 | 50 | 20 | 10 | 45 | 80 |
| composition | | MMA | 89 | 80 | 79.4 | 80 | 80 | 78.1 | 76.7 | 82 |
| (mass %) | | PHeMI | 2.3 | 0.2 | 8.6 | 10 | 16 | 17.1 | 19.3 | 10 |
| | | CyMI | 8.8 | 19.8 | 12.1 | 10 | 4 | 4.8 | 4.1 | 8 |
| | | St | — | — | — | — | — | — | — | — |
| | | Total | 100 | 100 | 100 | 100 | 100 | 100 | 100 | 100 |
| optical | | $C \times 10^{12}$ | −0.6 | −2.8 | +1.7 | +0.8 | +3.0 | −0.9 | −1.0 | +0.6 |
| characteristics | | (Pa$^{-1}$) | | | | | | | | |
| | | Re (nm) | −17.3 | −4.0 | −0.3 | −1.9 | −0.6 | +0.3 | +2.7 | −5.4 |
| | | \|Rth\| (nm) | <20 | <10 | <10 | 2.3 | <10 | <10 | <10 | <10 |
| heat resistance | | Tg (° C.) | 131 | 138 | 140 | 139 | 140 | 140 | 141 | 137 |
| | | compatibility | A | A | A | A | A | A | B | C |
| | | refractive index difference | <0.01 | <0.02 | <0.02 | <0.02 | <0.02 | <0.01 | <0.03 | <0.04 |
| | | total light transmittance (%) | >90 | >90 | >90 | >90 | >90 | >90 | >88 | >85 |

TABLE 2-continued

|  | Example | | | | | | | |
|---|---|---|---|---|---|---|---|---|
|  | 1 | 2 | 3 | 4 | 5 | 6 | 7 | 8 |
| low birefringence | B | A | A | A | A | A | A | A |
| weather resistance | A | A | A | A | A | A | A | A |

TABLE 3

|  |  | Example | | | | | | | Comparative Example |
|---|---|---|---|---|---|---|---|---|---|
|  |  | 9 | 10 | 11 | 12 | 13 | 14 | 15 | 1 |
| resin type | A | A-4 | A-4 | A-6 | A-2 | A-5 | A-2 | A-2 | C-1 |
|  | B | B-1 | B-4 | B-2 | B-7 | B-2 | B-5 | B-6 |  |
| blending ratio | A | 40 | 60 | 20 | 80 | 20 | 45 | 65 | — |
| (mass %) | B | 60 | 40 | 80 | 20 | 80 | 55 | 35 | — |
| composition | MMA | 74.6 | 68 | 77 | 78 | 75.4 | 80.4 | 75.6 | 100 |
| (mass %) | PHeMI | 20.0 | 12 | 3 | 16 | BzMI (7) | 8.6 | 12.4 | — |
|  | CyMI | 5.4 | 20 | 16 | 2 | 15.6 | EtMI (11) | iPrMI (12) | — |
|  | St | — | — | 4 | 4 | — | — | — | — |
|  | Total | 100 | 100 | 100 | 100 | 100 | 100 | 100 | 100 |
| optical characteristics | C × $10^{12}$ (Pa$^{-1}$) | −0.3 | +3.0 | −1.3 | +3.0 | +2.9 | +1.1 | +2.2 | −4.7 |
|  | Re (nm) | +6.8 | +20.9 | −28.1 | −27.9 | +28.7 | −2.5 | +6.8 | −36 |
|  | \| Rth \| (nm) | <10 | <30 | <30 | <30 | <30 | <10 | <10 | — |
| heat resistance | Tg (° C.) | 143 | 130 | 136 | 137 | 144 | 139 | 143 | 121 |
| compatibility |  | C | C | A | A | B | A | A | — |
| refractive index difference |  | <0.04 | <0.04 | — | — | <0.03 | <0.02 | <0.02 | — |
| total light transmittance (%) |  | >85 | >85 | >90 | >90 | >88 | >90 | >90 | 92 |
| low birefringence |  | A | B | B | B | B | A | A | C |
| weather resistance |  | A | A | A | A | A | A | A | reference |

As shown in Tables 2 and 3, it was confirmed that, according to Examples 1 to 15, the acrylic thermoplastic resin compositions of the present invention excel in compatibility and have good transparency. In particular, by a smaller refractive index difference, compatibility was further excellent, transparency was higher, and further, appearance of the shaped article was excellent. Moreover, it was confirmed that the optical film obtained from the acrylic thermoplastic resin composition of the present invention has extremely small absolute values of the retardation and the photoelastic coefficient as optical characteristics. In particular, it is understood that, in the optical films of Examples 2 to 9, 14 and 15, its optical characteristics exhibit so-called zero-zero birefringence. In contrast, the optical film formed of the acrylic resin (C-1) of Comparative Example was inferior in optical characteristics in that the absolute value of the photoelastic coefficient is large and the absolute value of the retardation is large. Furthermore, the acrylic thermoplastic resin compositions obtained in Examples 1 to 15 had high heat resistance, and good weather resistance and low water absorbability.

Moreover, the effect of the weight average molecular weight and the glass-transition temperature of each of the first acrylic resin and the second acrylic resin to be combined on shaping workability of the acrylic thermoplastic resin composition was evaluated as "AA," "A," "B," and "C" depending on the melt flow rate at 230° C. and a load of 5 kg and whether there is a streak in an shaped object obtained by melt flow evaluation. The evaluation results are shown in Table 4. It is to be noted that, it was evaluated as "AA" in the case where the melt flow rate is less than 1.0 g/10 min and there is not a streak on appearance of the shaped object, "A" in the case where the melt flow rate is less than 0.75 g/10 min and there is not a streak on appearance of the shaped object, "B" in the case where the melt flow rate is less than 0.5 g/10 min and there is a slight streak on appearance of the shaped object, and "C" in the case where there is a streak on appearance of the shaped object.

TABLE 4

|  |  | Example | | | | | | |
|---|---|---|---|---|---|---|---|---|
|  |  | 1 | 5 | 6 | 7 | 9 | 11 | 12 |
| first acrylic resin | A | A-1 | A-2 | A-2 | A-3 | A-4 | A-6 | A-2 |
|  | blending ratio (mass %) | 75 | 80 | 90 | 55 | 40 | 20 | 80 |
|  | weight average molecular weight Mw(×$10^4$) | 20.4 | 19.4 | 19.4 | 17.6 | 15.4 | 17.2 | 19.4 |
|  | Tg (° C.) | 124 | 141 | 141 | 156 | 176 | 131 | 141 |
| second acrylic resin | B | B-3 | B-2 | B-4 | B-1 | B-1 | B-2 | B-7 |
|  | blending ratio (mass %) | 25 | 20 | 10 | 45 | 60 | 80 | 20 |
|  | weight average molecular weight Mw (×$10^4$) | 19.4 | 21.1 | 19.1 | 21.0 | 21.0 | 21.1 | 19.2 |
|  | Tg (° C.) | 148 | 135 | 163 | 129 | 129 | 135 | 123 |
| average molecular weight difference (×$10^4$) |  | 1.0 | 1.7 | 0.3 | 3.4 | 5.6 | 3.9 | 0.2 |
| shaping workability of resin composition |  | B | A | C | AA | AA | C | C |

According to a comparison between Example 6 and Examples 1, 5, 7 and 9, it is found that, in the case where a difference of the weight average molecular weights between the first acrylic resin and the second acrylic resin is 10000 or more, the melt flow rate is large and shaping workability becomes better such that there is little streak on appearance of the shaped object. Moreover, according to Examples 11 and 12, it is found that, in the case where the weight average molecular weight of the acrylic resin having a high glass-transition temperature is large or there is little difference between the weight average molecular weights, although shaping processing can be performed, its workability is lower compared with other Examples.

Example 16

The 100%, 200% and 300% stretched films were shaped from the press films obtained by the same method as Example 3 in accordance with the above-described method, and its optical characteristics were evaluated. The evaluation results are shown in Table 5.

Comparative Example 2

The 100%, 200% and 300% stretched films were shaped from the press films obtained by the same method as Comparative Example 1 in accordance with the above-described method, and its optical characteristics were evaluated. The evaluation results are shown in Table 5.

molten resin was charged by applying a pressure of 5 MPa higher than the injection pressure by which the resin is exactly charged in the die.

Optical characteristics of the obtained three-stage plate were evaluated, and it was confirmed that the retardation (Re) in the plate was less than 15 nm in the entire region. In addition, the above-described three-stage plate was evaluated by a crossed Nichols test in which a test piece is placed between two polarizing plates perpendicular to each other and whether transmitted light (presence or absence of light leakage) is observed is confirmed.

Next, as Comparative Example 3, a three-stage plate obtained by injection shaping in the same manner as the above-described Example 17 using the acrylic thermoplastic resin obtained in Comparative Example 1 was evaluated.

Figure 2:
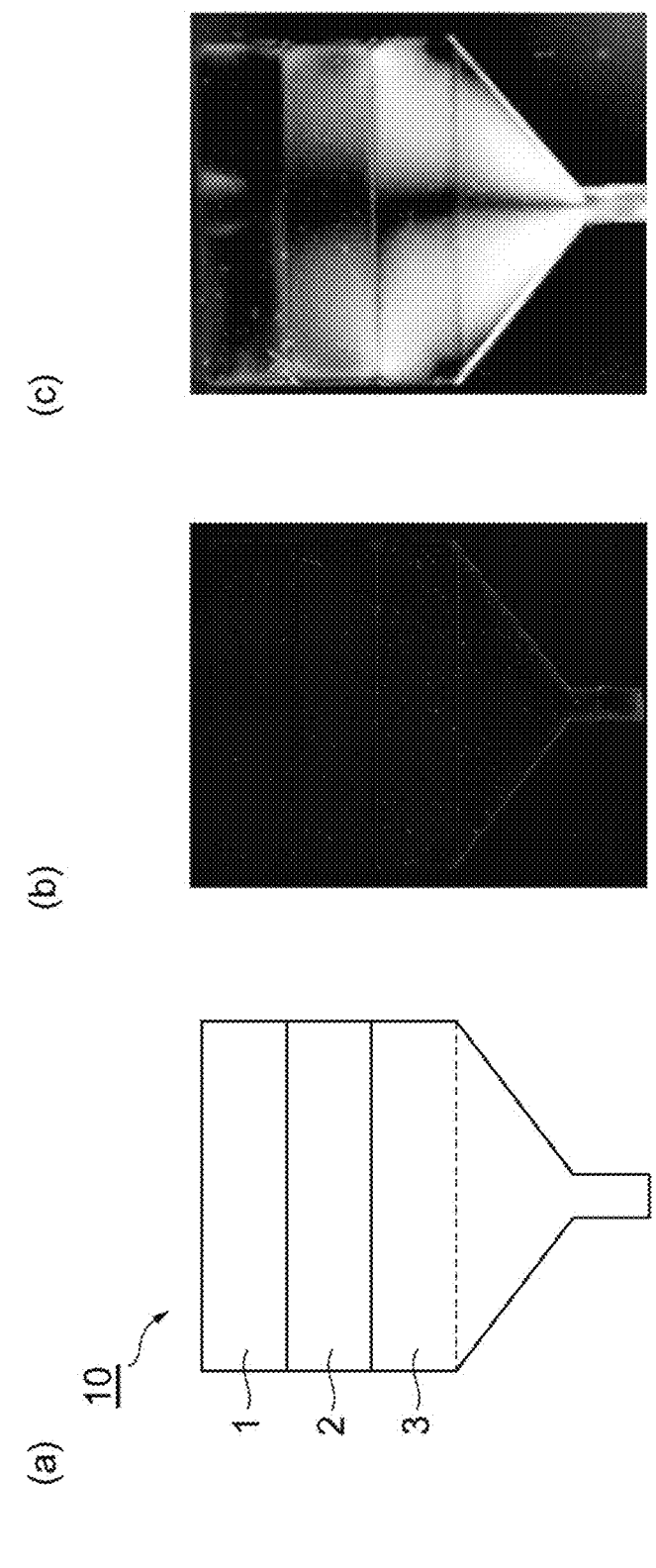
FIG. 2 is a diagram showing a three-stage plate and crossed Nichols test results.

FIGS. 2(b) and (c) are diagrams showing the results of the crossed Nichols test in Example 17 and Comparative Example 3, respectively. In general, in the case of injection shaping, stress strain caused by a flow of a polymer chain in the vicinity of the gate during shaping is inevitable, and as a result, light leakage due to (photoelastic) birefringence easily occurs. However, as shown in FIG. 2(b), it was confirmed that such light leakage is not observed in the three-stage plate formed of the acrylic thermoplastic resin according to the present invention. That is, the acrylic thermoplastic resin according to the present invention is a suitable material for injection-shaped articles such as lenses, pickup lenses and lens arrays which require low birefringence and optical uniformity.

TABLE 5

| | | Example 16 | | | | Comparative Example 2 | | | |
|---|---|---|---|---|---|---|---|---|---|
| stretching conditions | temperature (° C.) | — | 159 | 159 | 159 | — | 140 | 140 | 140 |
| | stretch ratio (%) | 0 | 100 | 200 | 300 | 0 | 100 | 200 | 300 |
| film characteristics | positive or negative of intrinsic birefringence | | negative | | | | negative | | |
| | Re (nm) | 0.0 | −1.9 | −4.5 | −6.6 | −1.0 | −37 | −67 | −100 |
| | absolute value of birefringence | 0.0 | 1.9 | 4.5 | 6.6 | 1.0 | 37 | 67 | 100 |
| | rate of birefringence change |K| | | $-0.02 \times 10^{-5}$ | | | | $-0.33 \times 10^{-5}$ | | |
| glass-transition temperature (° C.) | | | 139 | | | | 121 | | |

As shown in Table 5, it was confirmed that optical characteristics of the optical film formed of the acrylic thermoplastic resin composition of the present invention are less affected by orientation due to stretching. This fact means that a stretching processing for increasing optical film strength does not cause a birefringence change.

Example 17, Comparative Example 3

The acrylic thermoplastic resin obtained by performing the same operation as Example 3 was used to shape a three-stage plate, using an injection shaping machine (manufactured by FUNAC CORPORATION; AUTO SHOT 15A). FIG. 2(a) is a schematic diagram showing the three-stage plate manufactured in Example 17. The three-stage plate 10 has a first plate part 1 having a 1 mm thickness, a second plate part 2 having a 2 mm thickness, and a third plate part 3 having a 3 mm thickness.

Shaping conditions of the three-stage plate were as follows. The cylinder temperature was set to 230° C., 240° C., 240° C. and 240° C. from the hopper side. The die temperature was set to 80° C., the injection time was set to 10 seconds, and the cooling time was set to 30 seconds. The As described above, it is confirmed that the optical film formed of the acrylic thermoplastic resin composition of the present invention has excellent heat resistance and high optical isotropy (extremely small birefringence value, extremely small photoelastic coefficient) that cannot be achieved by existing resins. Furthermore, it is confirmed that the amount of birefringence change is extremely small when shaping a film or when performing an arbitrary stretching processing for increasing film strength.

This feature is extremely advantageous in industrial applications in that, during shaping or a stretching processing, (orientation) birefringence caused by polymer chain orientation due to a flow in melt shaping does not occur, and in that (photoelastic) birefringence caused by residual stress during shaping or external force does not occur. These characteristics are suitable for applications of polarizing plate protection films.

INDUSTRIAL APPLICABILITY

The acrylic thermoplastic resin composition of the present invention excels in transparency, and has good heat resistance and weather resistance, and moreover, its birefringence is highly controlled, and therefore, can be suitably used as optical materials, for example, for polarizing plate protection films used for liquid crystal displays, plasma displays, organic EL displays, field emission displays, and displays such as rear-projection televisions, retardation plates such as quarter-wavelength plates and half-wavelength plates, liquid crystal optical compensation films such as viewing angle control films, display front plates, display substrates, lenses, and further, transparent substrates used for solar cells and transparent conductive substrates such as touch panels.

In addition, the acrylic thermoplastic resin composition of the present invention can be used for waveguides, lenses, lens arrays, optical fibers, covering materials of optical fibers, LED lenses, lens covers, and the like in the fields of an optical communication system, an optical switching system, and an optical measurement system.

REFERENCE SIGNS LIST

10 three-stage plate

The invention claimed is:
1. An acrylic thermoplastic resin composition comprising:
a first acrylic resin having a first structural unit represented by the following formula (1) and a second structural unit represented by the following formula (2), wherein the first acrylic resin has, based on a total amount thereof, 50 to 97 mass % of the first structural unit and 3 to 50 mass % of the second structural unit, and the first acrylic resin has a weight average molecular weight Mw of 154,000 to 500,000 and a ratio Mw/Mn of the weight average molecular weight Mw to a number average molecular weight Mn of 1 to 4 in terms of polymethyl methacrylate, which are measured by a GPC measuring method; and
a second acrylic resin having the first structural unit represented by the following formula (1) and a third structural unit represented by the following formula (3), wherein the second acrylic resin has, based on a total amount thereof, 50 to 91 mass % of the first structural unit and 9 to 50 mass % of the third structural unit, and the second acrylic resin has a weight average molecular weight Mw of 191,000 to 500,000 and a ratio Mw/Mn of the weight average molecular weight Mw to a number average molecular weight Mn of 1 to 4 in terms of polymethyl methacrylate, which are measured by a GPC measuring method, wherein
an average molecular weight difference between the first acrylic resin and the second acrylic resin is 10000 or more,
a refractive index difference between the first acrylic resin and the second acrylic resins is 0.043 or less,
a total content of the first unit is from 70 to 90 mass % and a total content of the second structural unit and the third structural unit is from 10 to 35 mass % based on a total amount of the first acrylic resin and the second acrylic resin,
when the acrylic thermoplastic resin composition is shaped into a film having a thickness of 100 μm, an absolute value of retardation Re in an in-plane direction of the film is 30 nm or less, and
the acrylic thermoplastic resin composition has 1 to 90 mass % of the first acrylic resin and 10 to 99 mass % of the second acrylic resin based on the total amount of the first and the second acrylic resins,

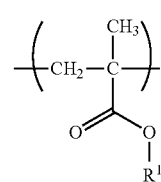

wherein $R^1$ represents methyl group;

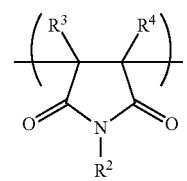

wherein $R^2$ represents a phenyl group or a phenyl group with at least one substituent selected from the group consisting of a halogen atom, a hydroxyl group, a nitro group, an alkoxy group having 1 to 12 carbon atoms, an alkyl group having 1 to 12 carbon atoms, and an arylalkyl group having 7 to 14 carbon atoms, and $R^3$ and $R^4$ each independently represent a hydrogen atom, an alkyl group having 1 to 12 carbon atoms or an aryl group having 6 to 14 carbon atoms;

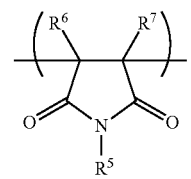

wherein $R^5$ represents a cyclohexyl group, and $R^6$ and $R^7$ each independently represent a hydrogen atom, an alkyl group having 1 to 12 carbon atoms, or an aryl group having 6 to 14 carbon atoms.

2. The acrylic thermoplastic resin composition according to claim 1, wherein the content of the second structural unit is 0.1 to 34.9 mass % based on a total amount of the first acrylic resin and the second acrylic resin.

3. The acrylic thermoplastic resin composition according to claim 1, wherein the first acrylic resin has, based on a total amount thereof, 50 to 95 mass % of the first structural unit and 5 to 50 mass % of the second structural unit.

4. The acrylic thermoplastic resin composition according to claim 1, wherein the second acrylic resin has, based on a total amount thereof, 70 to 90 mass % of the first structural unit and 10 to 30 mass % of the third structural unit.

5. The acrylic thermoplastic resin composition according to claim 1, wherein the first acrylic resin has a ratio Mw/Mn of the weight average molecular weight Mw to a number average molecular weight Mn of 1.5 to 4 in terms of polymethyl methacrylate, which are measured by a GPC measuring method.

6. The acrylic thermoplastic resin composition according to claim 1, wherein the second acrylic resin has a ratio Mw/Mn of the weight average molecular weight Mw to a number average molecular weight Mn of 1.5 to 4 in terms of polymethyl methacrylate, which are measured by a GPC measuring method.

7. The acrylic thermoplastic resin composition according to claim 1, wherein an absolute value of a photoelastic coefficient is $3.0 \times 10^{-12}$ $Pa^{-1}$ or less.

8. The acrylic thermoplastic resin composition according to claim 1, wherein, when shaped into a uniaxially-stretched film, a slope K in the following linear relational equation (a) by least squares approximation satisfies the following equation (b):

$$\Delta n = K \times S + C \qquad (a)$$

$$|K| \leq 0.30 \times 10^{-5} \qquad (b)$$

wherein a birefringence in terms of a thickness of 100 μm of the uniaxially-stretched film is defined as Δn, a stretch ratio is defined as S, and C is a constant number and represents birefringence when not being stretched.

9. The acrylic thermoplastic resin composition according to claim 1, wherein when the acrylic thermoplastic resin composition is shaped into a film having a thickness of 100 μm, an absolute value of retardation Rth in a thickness direction of the film is 30 nm or less.

10. The acrylic thermoplastic resin composition according to claim 1, wherein glass-transition temperatures (Tg) of the first and the second acrylic resins are 120° C. or more.

11. The acrylic thermoplastic resin composition according to claim 1, wherein when the acrylic thermoplastic resin composition is shaped into a film having a thickness of 100 μm, a total light transmittance of the film is 85% or more.

12. The acrylic thermoplastic resin composition according to claim 1, wherein a weight-average molecular weight of the resin with higher Tg from the first and the second acrylic resins is lower than that of the resin with lower Tg from the first and the second acrylic resins.

13. A shaped article comprising the acrylic thermoplastic resin composition according to claim 1.

14. A film or sheet comprising the acrylic thermoplastic resin composition according to claim 1.

15. A film or sheet prepared by stretching at least in a uniaxial direction a resin sheet comprising the acrylic thermoplastic resin according to claim 1 and shaped by extrusion.

16. A film or sheet prepared by stretching at least in a uniaxial direction a resin sheet comprising the acrylic thermoplastic resin according to claim 1 and shaped by solution casting.

17. A polarizing plate protection film comprising the shaped article according to claim 13.

18. A retardation film comprising the shaped article according to claim 13.

19. A retardation plate comprising the shaped article according to claim 13.

20. A transparent plastic substrate comprising the shaped article according to claim 13.

21. A lens comprising the shaped article according to claim 13.

* * * * *